US012684613B2

(12) United States Patent
Katar et al.

(10) Patent No.: US 12,684,613 B2
(45) Date of Patent: Jul. 14, 2026

(54) BACK-TO-BACK TRANSMISSIONS VIA A MULTI-HOP RELAY PATH USING FLOW-SPECIFIC RESOURCE RESERVATION

(71) Applicant: QUALCOMM Incorporated, San Diego, CA (US)

(72) Inventors: Srinivas Katar, Fremont, CA (US); Xiaolong Huang, Santee, CA (US); Gyanranjan Hazarika, Milpitas, CA (US); Manish Shukla, Milpitas, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 18/344,011

(22) Filed: Jun. 29, 2023

(65) Prior Publication Data

US 2025/0008552 A1    Jan. 2, 2025

(51) Int. Cl.
*H04W 74/00* (2009.01)
*H04B 7/155* (2006.01)
*H04W 74/0808* (2024.01)

(52) U.S. Cl.
CPC .......... *H04W 74/006* (2013.01); *H04B 7/155* (2013.01); *H04W 74/0808* (2013.01)

(58) Field of Classification Search
None
See application file for complete search history.

(56) References Cited

U.S. PATENT DOCUMENTS 8,300,618 B2 * 10/2012 Joshi .................... H04B 7/2123
370/395.42
10,182,425 B2 * 1/2019 Morioka ................. H04W 4/70
(Continued)

FOREIGN PATENT DOCUMENTS

JP          2010206551 A      9/2010
WO      WO-2023111310 A1    6/2023

OTHER PUBLICATIONS

International Search Report and Written Opinion—PCT/US2024/034196—ISA/EPO—Oct. 4, 2024.

*Primary Examiner* — Anh Vu H Ly
(74) *Attorney, Agent, or Firm* — Holland & Hart LLP

(57) ABSTRACT
This disclosure provides methods, components, devices and systems for back-to-back transmissions via a multi-hop relay path using flow-specific resource reservation. Some aspects more specifically relate to flow-specific transmission opportunity (TXOP) sharing and/or orthogonal channel reservation in combination with a flow-specific sequence of time slots. In implementations in which flow-specific TXOP sharing is employed in combination with a flow-specific sequence of time slots, one or more wireless communication devices may determine whether a shared TXOP supersedes the flow-specific sequence of time slots in accordance with whether the shared TXOP is associated with a same flow as the sequence of time slots. In implementations in which orthogonal channel reservation is employed in combination with a flow-specific sequence of time slots, each wireless communication device of a multi-hop relay path may receive an indication of or otherwise be configured with a frequency channel via which to transmit.

29 Claims, 10 Drawing Sheets

(56)     References Cited

U.S. PATENT DOCUMENTS

| | | | | |
|---|---|---|---|---|
| 2011/0228742 A1* | 9/2011 | Honkasalo | ............ | H04L 5/0007 |
| | | | | 370/329 |
| 2013/0295921 A1 | 11/2013 | Bhargava et al. | | |
| 2017/0251471 A1* | 8/2017 | Jeong | ................ | H04W 52/0219 |
| 2020/0008107 A1* | 1/2020 | Zhang | ............... | H04W 74/0808 |
| 2020/0015268 A1* | 1/2020 | Zhang | ............... | H04W 74/0808 |
| 2024/0015706 A1* | 1/2024 | Tanaka | .............. | H04W 72/0446 |
| 2024/0340953 A1* | 10/2024 | Ajami | ............... | H04W 74/0866 |

* cited by examiner

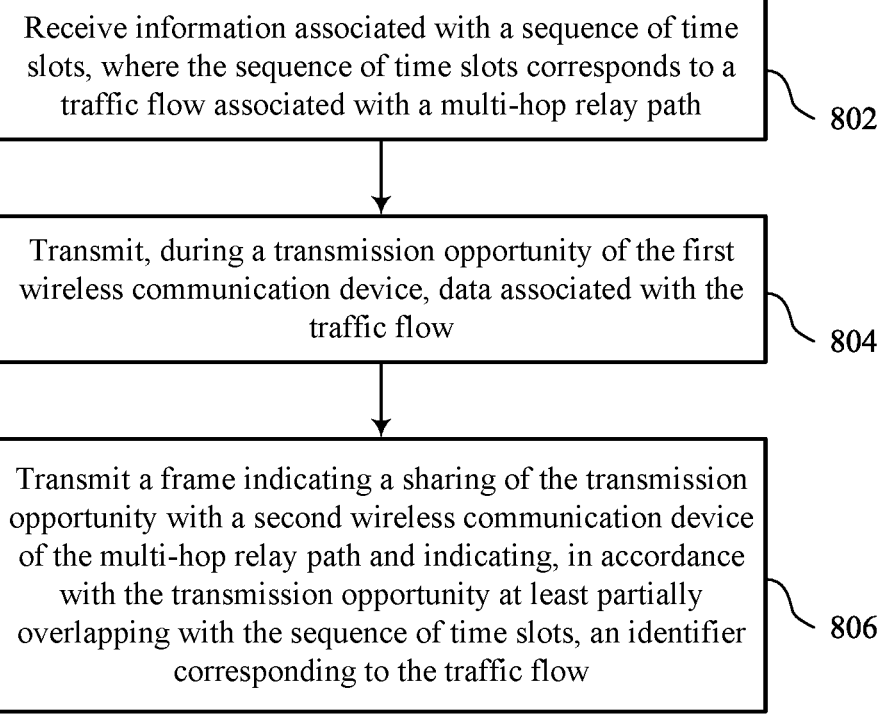

Receive information associated with a sequence of time slots, where the sequence of time slots corresponds to a traffic flow associated with a multi-hop relay path ⟍ 802

Transmit, during a transmission opportunity of the first wireless communication device, data associated with the traffic flow ⟍ 804

Transmit a frame indicating a sharing of the transmission opportunity with a second wireless communication device of the multi-hop relay path and indicating, in accordance with the transmission opportunity at least partially overlapping with the sequence of time slots, an identifier corresponding to the traffic flow ⟍ 806

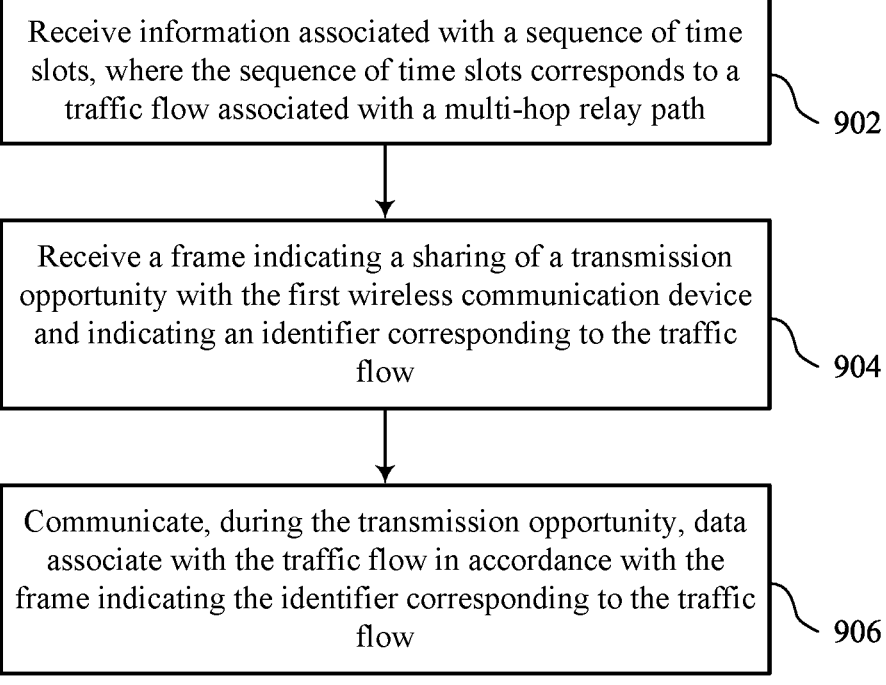

Receive information associated with a sequence of time slots, where the sequence of time slots corresponds to a traffic flow associated with a multi-hop relay path

902

Receive a frame indicating a sharing of a transmission opportunity with the first wireless communication device and indicating an identifier corresponding to the traffic flow

904

Communicate, during the transmission opportunity, data associate with the traffic flow in accordance with the frame indicating the identifier corresponding to the traffic flow

Figure 10:
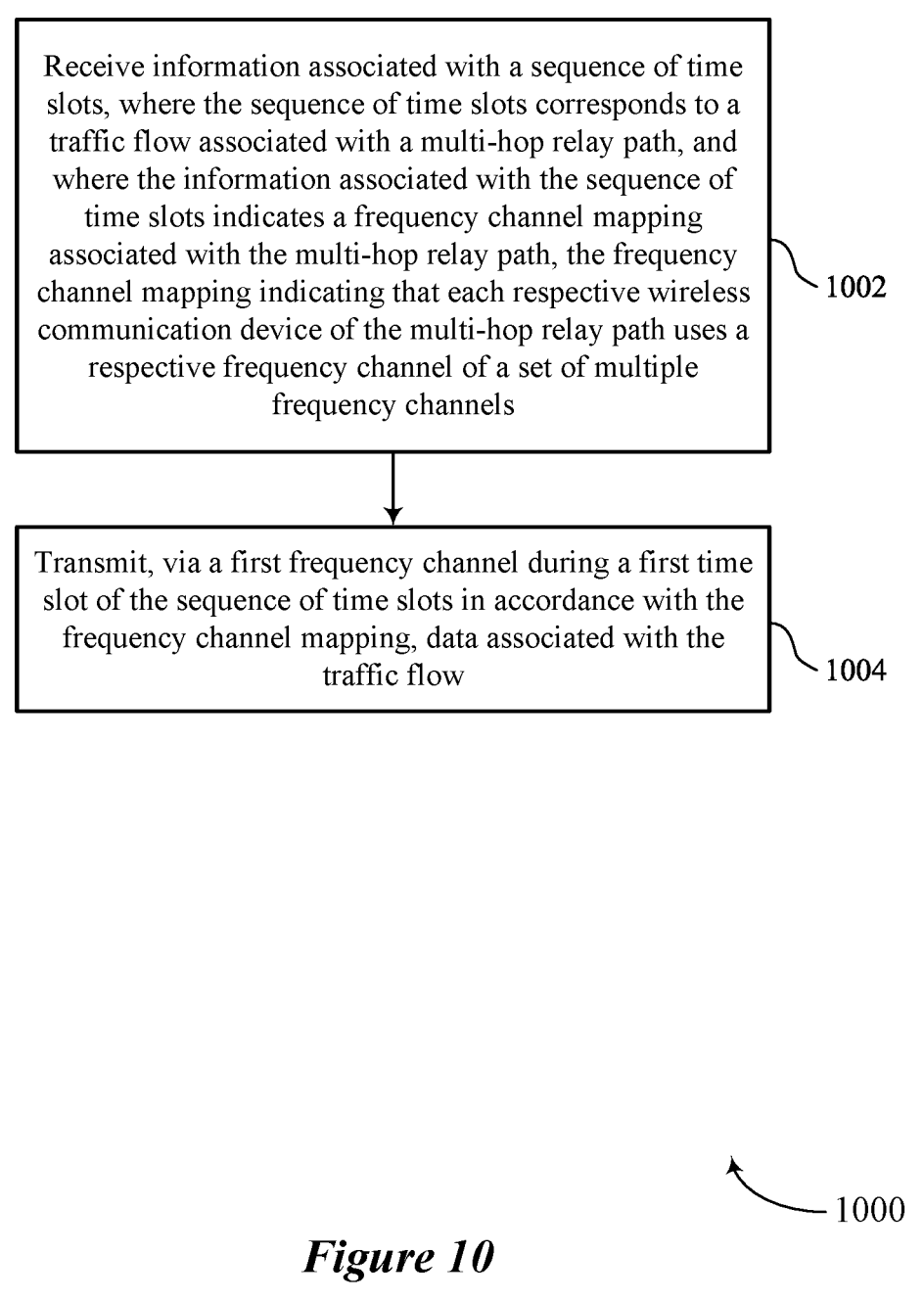

Receive information associated with a sequence of time slots, where the sequence of time slots corresponds to a traffic flow associated with a multi-hop relay path, and where the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels

— 1002

Transmit, via a first frequency channel during a first time slot of the sequence of time slots in accordance with the frequency channel mapping, data associated with the traffic flow

BACK-TO-BACK TRANSMISSIONS VIA A MULTI-HOP RELAY PATH USING FLOW-SPECIFIC RESOURCE RESERVATION

TECHNICAL FIELD

This disclosure relates to wireless communication and, more specifically, to back-to-back transmissions via a multi-hop relay path using flow-specific resource reservation.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless communication device. The first wireless communication device may include one or more memories storing processor-executable code, and one or more processors coupled with the one or more memories. The one or more processors may individually or collectively individually or collectively configured to, when executing the code, cause the first wireless communication device to receive information associated with a sequence of time slots, where the sequence of time slots corresponds to a traffic flow associated with a multi-hop relay path, transmit, during a transmission opportunity of the first wireless communication device, data associated with the traffic flow, and transmit a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

Another innovative aspect of the subject matter described in this disclosure can be implemented in a method for wireless communication by a first wireless communication device. The method may include receiving information associated with a sequence of time slots, where the sequence of time slots corresponds to a traffic flow associated with a multi-hop relay path, transmitting, during a transmission opportunity of the first wireless communication device, data associated with the traffic flow, and transmitting a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

Another innovative aspect of the subject matter described in this disclosure can be implemented in a first wireless communication device. The first wireless communication device may include means for receiving information associated with a sequence of time slots, where the sequence of time slots corresponds to a traffic flow associated with a multi-hop relay path, means for transmitting, during a transmission opportunity of the first wireless communication device, data associated with the traffic flow, and means for transmitting a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

Another innovative aspect of the subject matter described in this disclosure can be implemented in a non-transitory computer-readable medium storing code for wireless communication at a first wireless communication device. The code may include instructions executable by one or more processors, individually or collectively, to receive information associated with a sequence of time slots, where the sequence of time slots corresponds to a traffic flow associated with a multi-hop relay path, transmit, during a transmission opportunity of the first wireless communication device, data associated with the traffic flow, and transmit a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

Some implementations of the method, first wireless communication devices, and non-transitory computer-readable medium described herein may further include operations, features, means, or instructions for receiving a channel access priority mapping associated with the sequence of time slots, where the channel access priority mapping indicates that each respective wireless communication device of the multi-hop relay path may have channel access priority during a respective time slot of the sequence of time slots, and where the sharing of the transmission opportunity supersedes the channel access priority mapping in accordance with the frame indicating the identifier corresponding to the traffic flow.

Some implementations of the method, first wireless communication devices, and non-transitory computer-readable medium described herein may further include operations, features, means, or instructions for transmitting the frame to the second wireless communication device in accordance with the multi-hop relay path, where, in accordance with the channel access priority mapping associated with the sequence of time slots, the first wireless communication device may be scheduled for a first time slot of the sequence of time slots and the second wireless communication device may be scheduled for a second time slot of the sequence of time slots immediately subsequent to the first time slot.

Some implementations of the method, first wireless communication devices, and non-transitory computer-readable medium described herein may further include operations, features, means, or instructions for transmitting the frame to indicate, to the second wireless communication device, that the data associated with the traffic flow may be to be relayed in accordance with the multi-hop relay path during the transmission opportunity.

Another innovative aspect of the subject matter described in this disclosure can be implemented in a first wireless communication device. The first wireless communication device may include one or more memories storing processor-executable code, and one or more processors coupled with the one or more memories. The one or more processors may individually or collectively individually or collectively configured to, when executing the code, cause the first wireless communication device to receive information associated with a sequence of time slots, where the sequence of time slots corresponds to a traffic flow associated with a multi-hop relay path, receive a frame indicating a sharing of a transmission opportunity with the first wireless communication device and indicating an identifier corresponding to the traffic flow, and communicating, during the transmission opportunity, data associate with the traffic flow in accordance with the frame indicating the identifier corresponding to the traffic flow.

Another innovative aspect of the subject matter described in this disclosure can be implemented in a method for wireless communication by a first wireless communication device. The method may include receiving information associated with a sequence of time slots, where the sequence of time slots corresponds to a traffic flow associated with a multi-hop relay path, receiving a frame indicating a sharing of a transmission opportunity with the first wireless communication device and indicating an identifier corresponding to the traffic flow, and communicating, during the transmission opportunity, data associated with the traffic flow in accordance with the frame indicating the identifier corresponding to the traffic flow.

Another innovative aspect of the subject matter described in this disclosure can be implemented in a first wireless communication device. The first wireless communication device may include means for receiving information associated with a sequence of time slots, where the sequence of time slots corresponds to a traffic flow associated with a multi-hop relay path, means for receiving a frame indicating a sharing of a transmission opportunity with the first wireless communication device and indicating an identifier corresponding to the traffic flow, and means for communicating, during the transmission opportunity, data associated with the traffic flow in accordance with the frame indicating the identifier corresponding to the traffic flow.

Another innovative aspect of the subject matter described in this disclosure can be implemented in a non-transitory computer-readable medium storing code for wireless communication at a first wireless communication device. The code may include instructions executable by one or more processors, individually or collectively, to receive information associated with a sequence of time slots, where the sequence of time slots corresponds to a traffic flow associated with a multi-hop relay path, receive a frame indicating a sharing of a transmission opportunity with the first wireless communication device and indicating an identifier corresponding to the traffic flow, and communicating, during the transmission opportunity, data associate with the traffic flow in accordance with the frame indicating the identifier corresponding to the traffic flow.

Some implementations of the method, first wireless communication devices, and non-transitory computer-readable medium described herein may further include operations, features, means, or instructions for receiving a channel access priority mapping associated with the sequence of time slots, where the channel access priority mapping indicates that each respective wireless communication device of the multi-hop relay path may have channel access priority during a respective time slot of the sequence of time slots, and where the sharing of the transmission opportunity supersedes the channel access priority mapping in accordance with the frame indicating the identifier corresponding to the traffic flow.

Some implementations of the method, first wireless communication devices, and non-transitory computer-readable medium described herein may further include operations, features, means, or instructions for receiving the frame from a second wireless communication device in accordance with the multi-hop relay path, where, in accordance with the channel access priority mapping associated with the sequence of time slots, the first wireless communication device may be scheduled for a first time slot of the sequence of time slots and the second wireless communication device may be scheduled for a second time slot of the sequence of time slots immediately prior to the first time slot.

Another innovative aspect of the subject matter described in this disclosure can be implemented in a first wireless communication device. The first wireless communication device may include one or more memories storing processor-executable code, and one or more processors coupled with the one or more memories. The one or more processors may individually or collectively individually or collectively configured to, when executing the code, cause the first wireless communication device to receive information associated with a sequence of time slots, where the sequence of time slots corresponds to a traffic flow associated with a multi-hop relay path, and where the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels and transmit, via a first frequency channel during a first time slot of the sequence of time slots in accordance with the frequency channel mapping, data associated with the traffic flow.

Another innovative aspect of the subject matter described in this disclosure can be implemented in a method for wireless communication by a first wireless communication device. The method may include receiving information associated with a sequence of time slots, where the sequence of time slots corresponds to a traffic flow associated with a multi-hop relay path, and where the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels and transmitting, via a first frequency channel during a first time slot of the sequence of time slots in accordance with the frequency channel mapping, data associated with the traffic flow.

Another innovative aspect of the subject matter described in this disclosure can be implemented in a first wireless communication device. The first wireless communication device may include means for receiving information associated with a sequence of time slots, where the sequence of time slots corresponds to a traffic flow associated with a multi-hop relay path, and where the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels and means for transmitting, via a first frequency channel during a first time slot of the sequence of time slots in accordance with the frequency channel mapping, data associated with the traffic flow.

Another innovative aspect of the subject matter described in this disclosure can be implemented in a non-transitory computer-readable medium storing code for wireless communication at a first wireless communication device. The code may include instructions executable by one or more processors, individually or collectively, to receive information associated with a sequence of time slots, where the sequence of time slots corresponds to a traffic flow associated with a multi-hop relay path, and where the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels and transmit, via a first frequency channel during a first time slot of the sequence of time slots in accordance with the frequency channel mapping, data associated with the traffic flow.

Some implementations of the method, first wireless communication devices, and non-transitory computer-readable medium described herein may further include operations, features, means, or instructions for receiving a channel access priority mapping associated with the sequence of time slots, where the channel access priority mapping indicates that each respective wireless communication device of the multi-hop relay path may have channel access priority during a respective time slot of the sequence of time slots.

In some implementations of the method, first wireless communication devices, and non-transitory computer-readable medium described herein, the channel access priority mapping indicates a relatively highest channel access priority for the first wireless communication device for the first time slot and indicates a relatively highest channel access priority for a second wireless communication device for a second time slot of the sequence of time slots, the frequency channel mapping indicating the first frequency channel for the first wireless communication device and a second frequency channel for the second wireless communication device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 8 through 10 show flowcharts illustrating example processes that support back-to-back transmissions via a multi-hop relay path using flow-specific resource reservation according to some aspects of the present disclosure.

Like reference numbers and designations in the various drawings indicate like elements.

DETAILED DESCRIPTION

Figure 1:
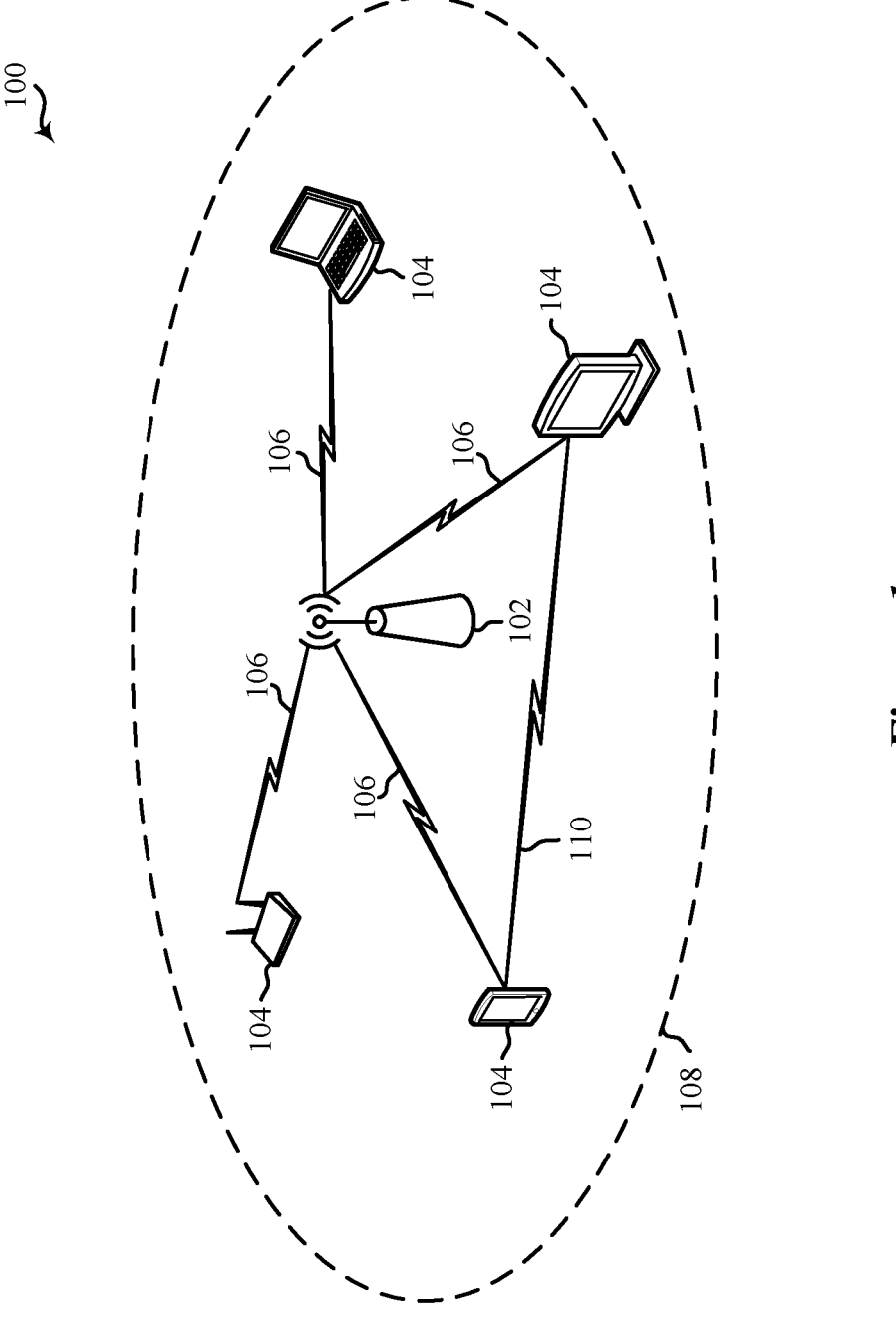
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to back-to-back transmissions via a multi-hop relay path using flow-specific resource reservation. Some aspects more specifically relate to flow-specific transmission opportunity (TXOP) sharing and/or orthogonal channel reservation in combination with a flow-specific sequence of time slots, which may be equivalently understood or referred to as a flow-specific TDMA series. In implementations in which one or more wireless communication devices employ flow-specific TXOP sharing in combination with a flow-specific sequence of time slots, a first wireless communication device may include, in a TXOP sharing (TXS) frame, an identifier corresponding to a traffic flow. As such, a second wireless communication device receiving the TXS frame may determine whether to communicate via the shared TXOP (instead of or in addition to communicating via the flow-specific sequence of time slots) in accordance with whether the traffic flow indicated by the TXS frame is the same as or different from a traffic flow to which the sequence of time slots corresponds. If the shared TXOP and the sequence of time slots are associated with delivery of the same traffic flow, the second wireless communication device may access the channel and transmit data during the shared TXOP (as the shared TXOP may supersede any channel access rules associated with the sequence of time slots). In implementations in which one or more wireless communication devices employ orthogonal channel reservation in combination with a flow-specific sequence of time slots, each wireless communication device of a multi-hop relay path may receive an indication of or otherwise be configured with a frequency channel via which to transmit in conjunction with the sequence of time slots. In some implementations, wireless communication devices that are (at least) two hops away from each other may use different frequency channels. As such, in the event that any two wireless communication devices of the multi-hop relay path are hidden nodes to each other, the two wireless communication devices may avoid causing interference to each other by way of using different frequency channels.

Particular aspects of the subject matter described in this disclosure can be implemented to realize one or more of the following potential advantages. In some implementations, by applying flow-specific TXOP sharing in combination with a flow-specific sequence of time slots, various wireless communication devices along a multi-hop relay path may more efficiently accommodate a low latency traffic flow that is somewhat less deterministic than the configured sequence of time slots, which may increase a reliability of low latency traffic and improve an end user experience. For example, by applying flow-specific TXOP sharing in combination with a flow-specific sequence of time slots, various wireless communication devices along a multi-hop relay path may more efficiently handle dynamic, aperiodic, and/or bursty traffic flows. Further, in accordance with applying orthogonal channel reservation in combination with a flow-specific sequence of time slots and reducing potential interference between wireless communication devices of a same multi-hop relay path, the wireless communication devices of the multi-hop relay path may more reliably transmit and receive data, which may increase overall system reliability while also enabling a denser packing of transmissions within a same time duration. As a result of such greater reliability, lower interference, and denser packing of transmissions, the described techniques may be implemented to further realize greater spectral efficiency, higher data rates, greater system capacity, and greater power savings (at least by way of reducing a quantity of potential retransmissions), among other benefits.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and 802.11bn). The WLAN 100 may include numerous wireless communication devices such as a wireless AP 102 and multiple wireless STAs1. While one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (such as TVs (including smart TVs), computer monitors, navigation systems, among others), music or other audio or stereo devices, remote control devices ("remotes"), printers, kitchen appliances (including smart refrigerators) or other household appliances, key fobs (such as for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In some wireless communications environments, Extremely High Throughput (EHT) systems or other systems compliant with future generations of the IEEE 802.11 family of wireless communication protocol standards may provide additional capabilities over other previous systems (such as High Efficiency (HE) systems or other legacy systems). EHT and newer wireless communication protocols may support flexible operating bandwidth enhancements at APs 102 and STAs 104, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHz (and each coupled to or with a different power amplifier). In some other examples, signals for transmission may be generated by four or more different transmit chains of the device, each having a bandwidth of 80 MHz.

In some other examples, the wireless communication device may operate in a contiguous 240 MHz bandwidth mode, or a noncontiguous 160+80 MHz bandwidth mode. In some examples, the signals for transmission may be generated by three different transmit chains of the device, each having a bandwidth of 80 MHz. In some other examples, the 240 MHz/160+80 MHz bandwidth modes also may be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some implementations, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some implementations, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (such as identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (such as identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

Some APs 102 and STAs 104 may implement techniques for spatial reuse that involve participation in a coordinated communication scheme. According to such techniques, an AP 102 may contend for access to a wireless medium to obtain control of the medium for a TXOP. The AP 102 that wins the contention (hereinafter also referred to as a "sharing AP") may select one or more other APs 102 (hereinafter also referred to as "shared APs") to share resources of the TXOP. The sharing and shared APs 102 may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP 102 may partition the TXOP into multiple time segments or frequency segments each including respective time or frequency resources representing a portion of the TXOP, The sharing AP 102 may allocate the time or frequency segments to itself or to one or more of the shared APs 102. For example, each shared AP 102 may utilize a partial TXOP assigned by the sharing AP 102 for its uplink or downlink communications with its associated STAs 104.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs 102 and their respective BSSs, subject to appropriate power control and link adaptation. For example, the sharing AP 102 may limit the transmit powers of the selected shared APs 102 such that interference from the selected APs 102 does not prevent STAs 104 associated with the TXOP owner from successfully decoding packets transmitted by the sharing AP 102. Such techniques may be used to reduce latency because the other APs 102 may not need to wait to win contention for a TXOP to be able to transmit and receive data according to conventional CSMA/CA or EDCA techniques. Additionally, by enabling a group of APs 102 associated with different BSSs to participate in a coordinated AP transmission session, during which the group of APs 102 may share at least a portion of a single TXOP obtained by any one of the participating APs 102, such techniques may increase throughput across the BSSs associated with the participating APs 102 and also may achieve improvements in throughput fairness. Furthermore, with appropriate selection of the shared APs 102 and the scheduling of their respective time or frequency resources, medium utilization may be maximized or otherwise increased while packet loss resulting from OBSS interference is minimized or otherwise reduced. Various implementations may achieve these and other advantages without requiring that the sharing AP 102 or the shared APs 102 be aware of the STAs 104 associated with other BSSs, without requiring a preassigned or dedicated master AP 102 or preassigned groups of APs 102, and without requiring backhaul coordination between the APs 102 participating in the TXOP.

In some examples in which the signal strengths or levels of interference associated with the selected APs 102 are relatively low (such as less than a given value), or when the decoding error rates of the selected APs 102 are relatively low (such as less than a threshold), the start times of the communications among the different BSSs may be synchronous. Conversely, when the signal strengths or levels of interference associated with the selected APs 102 are relatively high (such as greater than the given value), or when the decoding error rates of the selected APs 102 are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP 102 (or its associated STAs 104) to decode the preamble of the wireless packet and obtain the BSS color value carried in the wireless packet to determine whether the wireless packet is an intra-BSS packet or an OBSS packet. In this manner, each of the participating APs 102 and their associated STAs 104 may be able to receive and decode intra-BSS packets in the presence of OBSS interference.

In some examples, the sharing AP 102 may perform polling of a set of un-managed or non-co-managed APs 102 that support coordinated reuse to identify candidates for future spatial reuse opportunities. For example, the sharing AP 102 may transmit one or more spatial reuse poll frames as part of determining one or more spatial reuse criteria and selecting one or more other APs 102 to be shared APs 102. According to the polling, the sharing AP 102 may receive responses from one or more of the polled APs 102. In some specific examples, the sharing AP 102 may transmit a coordinated AP TXOP indication (CTI) frame to other APs 102 that indicates time and frequency of resources of the TXOP that can be shared. The sharing AP 102 may select one or more candidate APs 102 upon receiving a coordinated AP TXOP request (CTR) frame from a respective candidate AP 102 that indicates a desire by the respective AP 102 to participate in the TXOP. The poll responses or CTR frames may include a power indication, for example, an RX power or RSSI measured by the respective AP 102. In some other examples, the sharing AP 102 may directly measure potential interference of a service supported (such as UL transmission) at one or more APs 102, and select the shared APs 102 based on the measured potential interference. The sharing AP 102 generally selects the APs 102 to participate in coordinated spatial reuse such that it still protects its own transmissions (which may be referred to as primary transmissions) to and from the STAs 104 in its BSS. The selected APs 102 may then be allocated resources during the TXOP as described above.

In some systems, delivering a burst of latency sensitive traffic in an end-to-end multi-hop mesh may be associated with an expectation for each 'hop' (such as each wireless communication device along a multi-hop path) to contend for a channel and obtain TXOPs independently, which may lead to uncontrolled delay (as there may be no bound for how long a wireless communication device may attempt to obtain a TXOP, which may be a relatively long duration in congested networks). A multi-hop mesh, which may be referred to as a multi-hop (relay) path, may be an example deployment scenario in which a STA 104 communicates indirectly with a root AP (R-AP) 102 via one or multiple intermediate or relay devices, which may be referred to as satellite APs (S-APs) 102. An R-AP 102 may be understood as an AP 102 that is directly connected to an internet and an S-AP 102 may be understood as an AP 102 that has access to the internet via the R-AP 102. In some scenarios, a STA 104 may function as an S-AP 102. For a STA 104, functioning as an S-AP 102 may be associated with (such as involve) functioning as a soft AP. An S-AP 102 may be an example of any wireless communication device capable of forwarding, relaying, and/or repeating information and transmissions from one wireless communication device to another wireless communication device.

In some implementations, various wireless communication devices (such as any combination of one or more R-APs 102, one or more S-APs 102, or one or more STAs 104) may support one or more mechanisms according to which at least one wireless communication device may use flow-specific TXOP sharing and/or orthogonal channel reservation in combination with a flow-specific TDMA series. In implementations in which a TXOP is shared for a flow for which an overlapping TDMA series is also setup, channel access rules associated with the TDMA series may be superseded (such as ignored by the device with which the TXOP is shared, while other devices may still respect the channel access rules) for a duration of time in which the shared TXOP overlaps with the TDMA series. Additionally, or alternatively, in implementations in which orthogonal channel reservation is used in combination with a flow-specific TDMA series, wireless communication devices that are at least two hops away from each other may use different frequency channels when transmitting and/or receiving data associated with the corresponding flow. As such, various wireless communication devices may enable back-to-back transmissions for one or more specific flows via multiple hops.

Figure 2:
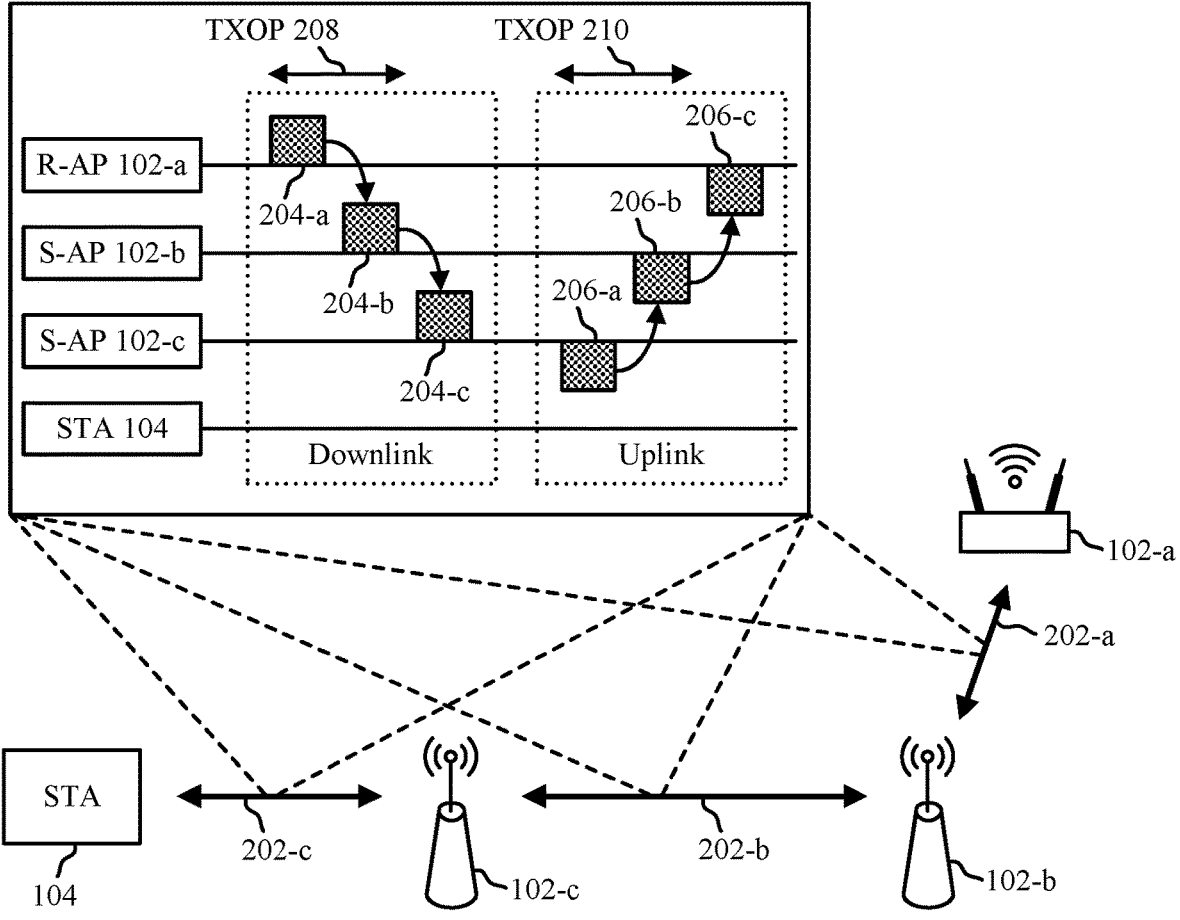
FIG. 2 shows an example signaling diagram that supports back-to-back transmissions via a multi-hop relay path using flow-specific resource reservation according to some aspects of the present disclosure.
Figure 2:

FIG. 2 shows an example signaling diagram 200 that supports back-to-back transmissions via a multi-hop relay path using flow-specific resource reservation according to some aspects of the present disclosure. The signaling diagram 200 may implement or be implemented to realize aspects of the WLAN 100. For example, the signaling diagram 200 illustrates communication between an R-AP 102-*a*, an S-AP 102-*b*, an S-AP 102-*c*, and a STA 104 via a multi-hop relay path, each of which may be an example of a corresponding device described herein. Further, each of the R-AP 102-*a*, the S-AP 102-*b*, the S-AP 102-*c*, and the STA 104 may be an example of or otherwise referred to as a wireless communication device. In some implementations, one or more of the wireless communication devices of FIG. 2 may support one or more signaling- or configuration-based mechanisms to enable back-to-back transmissions for specific flows via multiple hops of a multi-hop relay path.

As illustrated in the example of the signaling diagram 200, the R-AP 102-*a* may communicate with the S-AP 102-*b* via a communication link 202-*a*, the S-AP 102-*b* may communicate with the S-AP 102-*c* via a communication link 202-*b*, and the S-AP 102-*c* may communicate with the STA 104 via a communication link 202-*c*. Further, although the referred to herein as "satellite" APs 102, the S-AP 102-*b* and the S-AP 102-*c* may be examples of any wireless communication devices capable of forwarding, relaying, and/or repeating information and transmissions from one wireless communication device to another wireless communication device. As such, although referred to herein as the S-AP 102-*b* and the S-AP 102-*c*, the S-AP 102-*b* and the S-AP 102-*c* may be equivalently referred to or understood as wireless repeaters.

In some aspects, one or more of the wireless communication devices of the signaling diagram 200 may combine two or more communication mechanisms to enable such back-to-back transmissions for specific flows via multiple hops. For example, one or more of the wireless communication devices may combine two or more of flow-specific TDMA slot reservations (separated by random backoff (RBO)), flow-specific TXOP sharing on top of flow-specific TDMA slots, and orthogonal channel reservation for hidden terminal hops on top of flow-specific TDMA slots.

Using or otherwise in accordance with flow-specific TDMA slot reservations, a wireless communication device may communicate via a flow-specific TDMA series, which may be equivalently referred to or understood as a sequence of (TDMA) time slots or a TDMA slot series. In terms of architecture, a wireless communication device may configure (or be configured with) a periodic TDMA series and each TDMA slot of the TDMA series may be used to deliver a payload of one or more designated flows on a specific hop. In other words, a wireless communication device may receive, obtain, identify, or otherwise determine information pertaining to a sequence of time slots associated with (such as to be used exclusively for) one or more flows and the wireless communication device may transmit a data frame associated with any of the one or more flows during a time slot of the sequence of time slots that corresponds to the wireless communication device (as different time slots of the sequence of time slots may correspond to, such as be used by, different wireless communication devices of a multi-hop relay path). In some deployment scenarios, a flow-specific TDMA series may remove or mitigate delay caused by contentions in accordance with each TDMA slot of a TDMA series corresponding to a specific hop. For example, because each TDMA slot may correspond to a specific wireless communication device (such as a specific hop) by configuration (such as by design and/or signaling), a wireless communication device may refrain from contending for medium access during TDMA slots that correspond to other wireless communication devices (or may contend for medium access using de-prioritized or relatively lower priority channel access parameters).

In some aspects, each TDMA slot in a TDMA series may have a respective fixed duration. As such, each TDMA slot in a TDMA series may have a same duration, or some TDMA slots in a TDMA series may have different durations. In some aspects, TDMA slots in a periodic TDMA series may have a common (such as shared or universal) periodic interval. In such aspects, each TMDA slot of a periodic TDMA series may occur or repeat in accordance with a same periodicity. As described herein, a set of repeating TDMA slots may be understood as a re-occurring time domain resource during which a specific wireless communication device may transmit. For example, if a periodic TDMA series is configured with a first periodicity associated with a first period, the S-AP 102-*b* may transmit during a set of repeating TDMA slots including a first time slot and a second time slot the first period after the first time slot.

One or more wireless communication devices may setup (such as establish or configure) a TDMA series in accordance with one or more protocols. In some aspects, one or more wireless communication devices may setup a TDMA series using a mesh-based protocol, such as an EasyMesh-based protocol. In some examples of setting up a TDMA series in accordance with a mesh-based protocol, an intent may be made known by the STA 104 (a client device) by sending a stream classification service (SCS) request to the S-AP 102-*c* (a serving AP). In such examples, the S-AP 102-*c* (the serving AP) may forward the SCS request from the STA 104 to a controller (such as a WLAN controller). The S-AP 102-*c* may transmit the SCS request of the STA 104 to the controller via a management plane, such as an EasyMesh management plane. In some other examples of setting up a TDMA series in accordance with a mesh-based protocol, a TDMA series may be directly configured on the R-AP 102-*a* or the controller (by an operator).

The controller may configure (such as setup, establish, or decide on) a periodic TDMA series (in accordance with the SCS request forwarded to the controller or the direct configuration of the controller). In some implementations, the periodic TDMA series may include a first TDMA schedule for the R-AP 102-*a*, a second TDMA schedule for the S-AP 102-*b*, and a third TDMA schedule for the S-AP 102-*c*. Each TDMA schedule may include or otherwise be associated with (such as defined by) a traffic classification (TCLAS), a start time, a duration, and a period. In accordance with configuring the periodic TDMA series, the controller may transmit information indicative of a TDMA schedule for an AP 102 to that AP 102 as a reserved TDMA schedule. For example, the controller may transmit, to the R-AP 102-*a*, first information indicative of the first TDMA schedule as a reserved TDMA schedule for the R-AP 102-*a*. Similarly, the controller may transmit, to the S-AP 102-*b*, second information indicative of the second TDMA schedule as a reserved TDMA schedule for the S-AP 102-*b* and may transmit, to the S-AP 102-*c*, third information indicative of the third TDMA schedule as a reserved TDMA schedule for the S-AP 102-*c*.

Further, in some examples, the controller may transmit information indicative of a TDMA schedule for an AP 102 to a set of (such as all) other in-network APs 102 as a restricted TDMA schedule. For example, the controller may transmit, to the R-AP 102-*a*, information indicative of the second TDMA schedule and the third TDMA schedule as restricted TDMA schedules. Similarly, the controller may transmit, to the S-AP 102-*b*, information indicative of the first TDMA schedule and the third TDMA schedule as restricted TDMA schedules. Likewise, the controller may transmit, to the S-AP 102-*c*, information indicative of the first TDMA schedule and the second TDMA schedule as restricted TDMA schedules. In some implementations, the controller may transmit information indicative of a TDMA schedule (as either a reserved or restricted TDMA schedule) to an AP 102 via a management plan, such as an EasyMesh management plane. In some aspects, an AP 102 of a TDMA schedule may create a protected communication schedule, such as a coordinated restricted target wake time (C-R-TWT) schedule, for its reserved TDMA schedule for one or more neighboring APs 102 (to suppress channel access contention from the one or more neighboring APs 102).

Additionally, or alternatively, one or more wireless communication devices may setup (such as establish or configure) a TDMA series in accordance with (such as using) one or more per-hop SCS requests. In such examples in which one or more wireless communication devices setup a TDMA series using per-hop SCS request(s), the STA 104 (a client device) may make an intent known by transmitting an SCS request to the S-AP 102-*c* (a serving AP 102 for the STA 104). The backhaul STA (bSTA) associated with (such as collocated with) the S-AP 102-*c* may create and send an SCS request for the same flow to the S-AP 102-*b* (an upstream AP 102 of the S-AP 102-*c*). The S-AP 102-*b* may further transmit an SCS request to the R-AP 102-*a* (in accordance with using per-hop SCS requests). In some aspects, a start time, duration, and periodicity of the SCS request sent by the S-AP 102-*c* to the S-AP 102-*b* may place a TDMA slot adjacent to that of the downstream hop. One or more protocol elements may be included in the (802.11be) SCS request to indicate (such as specify) a TDMA interval. Further, one or more protocol elements may be included in the (802.11be) SCS request sent by the S-AP 102-*b* to the R-AP 102-*a* to avoid overlapping with the TDMA interval between the S-AP 102-*c* and the STA 104.

In accordance with the per-hop SCS requests, an AP 102 of a TDMA schedule may create a protected communication schedule, such as a C-R-TWT schedule, for its reserved TDMA schedule for one or more neighboring APs 102 (to suppress channel access contention from the one or more neighboring APs 102). In some aspects, an AP 102 that creates a protected communication schedule may signal an indication of (such as propagate) the protected communication schedule of the AP 102 to one or more APs 102 that are two hops away from the AP 102 (such as two hops away from the C-R-TWT owner). In some aspects, the AP 102 may signal an indication of the protected communication schedule of the AP 102 to one or more APs 102 that are at least within two hops away from the AP 102.

As described herein, a flow-specific TDMA series may be associated with a channel access priority mapping for each wireless communication device along a multi-hop relay path to which the TDMA series corresponds. For example, in accordance with a channel access priority mapping, a first wireless communication device may have relatively higher channel access priority than a second wireless communication device during a first time slot and the second wireless communication device may have relatively higher channel access priority than the first wireless communication device during a second time slot. Such relative channel access priorities may be controlled by or otherwise associated with R-TWT schedules, differentiated EDCA parameters, or any other schedules, parameters, or configurations that might give one wireless communication device a relatively higher likelihood for channel access than another wireless communication device.

In some implementations, regardless of how the wireless communication devices of the signaling diagram 200 establish a flow-specific TDMA series (such as a flow-specific sequence of slots), the wireless communication devices may further employ one or more mechanisms according to which at least one wireless communication device may use flow-specific TXOP sharing and/or orthogonal channel reservation in combination with a flow-specific TDMA series. In implementations in which a TXOP is shared for a flow for which an overlapping TDMA series is also setup, channel access rules associated with the TDMA series may be superseded (such as ignored) for a duration of time in which the shared TXOP overlaps with the TDMA series. As such, a wireless communication device may leverage TXOP sharing to accommodate (such as to provide timely resources for) dynamic, aperiodic, or bursty data traffic associated with a flow for which a TDMA series is also setup. In some aspects, flow-specific TXOP sharing in combination with a flow-specific TDMA series may be understood as or result in a correlation between a flow context of TDMA slot assignments with TXOP sharing allocation request and trigger frames.

For example, the R-AP 102-*a*, the S-AP 102-*b*, the S-AP 102-*c*, and the STA 104 may communicate in accordance with a multi-hop relay path between the R-AP 102-*a* and the STA 104 and may leverage flow-specific TXOP sharing in combination with a flow-specific TDMA series. A traffic flow via the multi-hop relay path may include downlink traffic or uplink traffic, or both. As illustrated in the example downlink communication sequence of the signaling diagram 200, the R-AP 102-*a* may transmit a data frame 204-*a* to the S-AP 102-*b*, the S-AP 102-*c* may transmit a data frame 204-*b* (which may be a relayed version of the data frame 204-*a*) to the S-AP 102-*c*, and the S-AP 102-*c* may transmit a data frame 204-*c* (which may be a relayed version of the data frame 204-*b*) to the STA 104. Each if not all of the R-AP 102-*a*, the S-AP 102-*b*, the S-AP 102-*c*, and the STA 104 may be associated with (such as configured with) a respective TDMA schedule according to which each respective device may access the medium to transmit a data frame. If the R-AP 102-*a* obtains and shares a TXOP 208 for the specific flow with at least the S-AP 102-*b*, however, the S-AP 102-*b* may transmit the data frame 204-*b* during the shared TXOP 208 regardless of any slot TDMA schedule-related slot boundaries. As such, in accordance with the flow-specific TXOP sharing, the S-AP 102-*b* may transmit the data frame 204-*b* prior to a time slot during which the S-AP 102-*b* may have otherwise been scheduled to transmit the data frame 204-*b* (such as prior to a time slot of a TDMA schedule for the S-AP 102-*b*).

In the example uplink communication sequence of the signaling diagram 200, the STA 104 may transmit a data frame 206-*a* to the S-AP 102-*c*, the S-AP 102-*c* may transmit a data frame 206-*b* (which may be a relayed version of the data frame 206-*a*) to the S-AP 102-*b*, and the S-AP 102-*b* may transmit a data frame 206-*c* (which may be a relayed version of the data frame 206-*b*) to the R-AP 102-*a*. With similarity to the downlink communication sequence, each of the STA 104, the S-AP 102-*c*, the S-AP 102-*b*, and the R-AP 102-*a* may be associated with a respective TDMA schedule. If the STA 104 obtains and shares a TXOP 210 for the specific flow with at least the S-AP 102-*c*, however, the S-AP 102-*c* may transmit the data frame 206-*b* prior to a time slot during which the S-AP 102-*c* may have otherwise been scheduled to transmit the data frame 206-*b* (such as prior to a time slot of a TDMA schedule for the S-AP 102-*c*).

Further, in implementations in which orthogonal channel reservation is used in combination with a flow-specific TDMA series, wireless communication devices that are at least two hops away from each other may use different frequency channels when transmitting and/or receiving data associated with the corresponding flow. As such, wireless communication devices along a relay path may more densely pack in transmissions within a configured TDMA series and, accordingly, may achieve greater throughput in addition to a lower likelihood of interference between different devices along a multi-hop relay path. For example, in the example downlink communication sequence of the signaling diagram 200, the R-AP 102-*a* may transmit the data frame 204-*a* using a first frequency channel and the S-AP 102-*c* may transmit the data frame 204-*c* using a second frequency channel different from (such as orthogonal to) the first frequency channel. Similarly, in the example uplink communication sequence of the signaling diagram 200, the STA 104 may transmit the data frame 206-*a* using a first frequency channel and the S-AP 102-*b* may transmit the data frame 206-*c* using a second frequency channel different from (such as orthogonal to) the first frequency channel.

Figure 3:
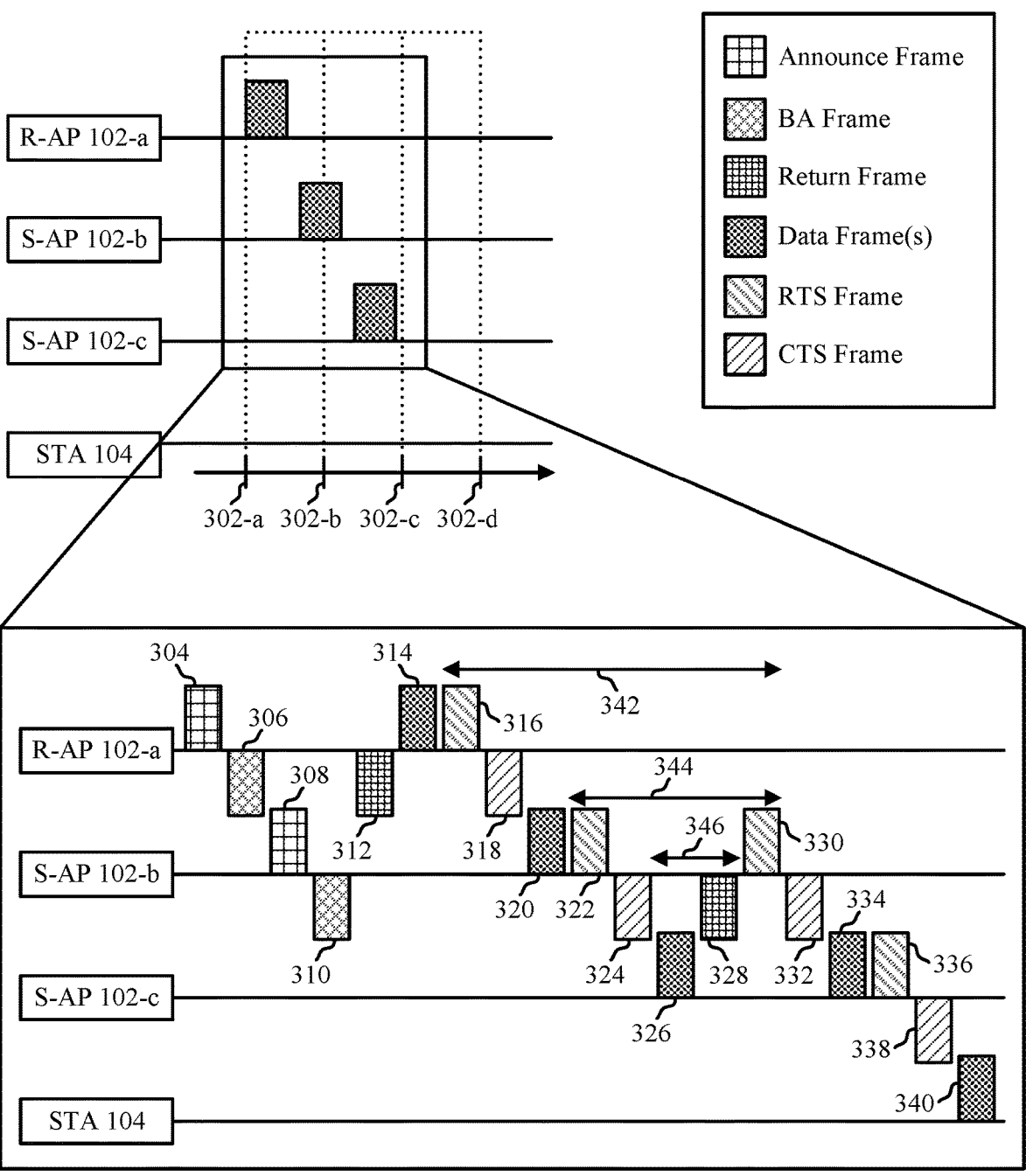
FIGS. 3-5 show examples of communication timelines that support back-to-back transmissions via a multi-hop relay path using flow-specific resource reservation according to some aspects of the present disclosure.

FIG. 3 shows an example communication timeline 300 that supports back-to-back transmissions via a multi-hop relay path using flow-specific resource reservation according to some aspects of the present disclosure. The communication timeline 300 illustrates communication between the R-AP 102-*a*, the S-AP 102-*b*, the S-AP 102-*c*, and the STA 104, which may be examples of corresponding devices as illustrated by and described with reference to FIG. 2, each of which may be an example of a wireless communication device. In some implementations, the wireless communication devices of the communication timeline 300 may employ flow-specific TXOP sharing in combination with a flow-specific sequence of time slots (such as a flow-specific TDMA series).

For example, each of at least the R-AP 102-*a*, the S-AP 102-*b*, and the S-AP 102-*c* may be associated with a respective schedule of time slots (such as a respective TDMA schedule) and, collectively, may relay data traffic between the R-AP 102-*a* and the STA 104 in accordance with a flow-specific sequence of time slots associated with a time epoch 302-*a*, a time epoch 302-*b*, a time epoch 302-*c*, and a time epoch 302-*d*. In some aspects, the time epoch 302-*a* may define or indicate a starting point of a first time slot corresponding to the R-AP 102-*a*, the time epoch 302-*b* may define or indicate a starting point of a second time slot corresponding to the S-AP 102-*b*, and the time epoch 302-*c* may define or indicate a starting point of a third time slot corresponding to the S-AP 102-*c*. The flow-specific sequence of time slots may be associated with one or more channel access rules (such as rules pertaining to allowance for contention, use prioritized EDCA parameters, and/or TXOP termination) and, in some examples, such channel access rules may be applied at each of the time epochs associated with the flow-specific sequence of time slots. Such channel access rules may be equivalently referred to or understood as one or more rules associated with a channel access priority mapping.

In accordance with employing flow-specific TXOP sharing on top of the flow-specific sequence of time slots, such channel access rules may not apply (for a device with which a TXOP is shared) for a duration of a shared TXOP (as long as the shared TXOP is for the same flow as the sequence of time slots). For example, if the R-AP 102-*a* shares a TXOP with the S-AP 102-*b* and the S-AP 102-*c*, the S-AP 102-*b* and the S-AP 102-*c* may access the medium and perform a transmission prior to the time epoch 302-*b* and the time epoch 302-*c*, respectively. In other words, a TXOP shared by an AP 102 to serve a designated flow (such as a same flow for which an overlapping TDMA series is designated) may be free from C-R-TWT boundary and/or TDMA owner rules. More generally, an AP 102 of an earlier delivery order position (per the flow-specific sequence of time slots) of a classified flow may share its TXOP using triggers or other TXOP sharing frames with an immediate successor AP 102 in the delivery order (per the flow-specific sequence of time slots). Such TXOP sharing over potentially multiple hops, free from TDMA slot boundaries, may reduce latency for relatively less deterministic traffic (such as dynamic, aperiodic, or bursty traffic).

In some implementations, a controller may configure the delivery order of back-to-back TDMA slots for a flow (such that the R-AP 102-*a*, the S-AP 102-*b*, and the S-AP 102-*c* may have back-to-back transmission opportunities) and a flow identifier may be created (such as generated, calculated, selected, identified, indicated, configured, or otherwise determined) for the flow-specific back-to-back TDMA slots. In other words, a flow identifier may be created for the flow-specific sequence of time slots. A TXOP owner may signal (such as include) the flow identifier in an allocation request frame and/or a trigger frame associated with a TXOP sharing sequence used within the flow-specific back-to-back TDMA slots. Such a flow identifier may be included in a dedicated information element of the allocation request frame and/or the trigger frame or may be included in another information element, such as a vendor specific information element in an allocation request frame. Further, a flow identifier may correspond to a single flow or may correspond to a specific group of flows.

In accordance with an example TXOP sharing sequence, the R-AP 102-*a* may transmit an announcement frame 304 to indicate, to one or more other wireless communication devices, information associated with an intent to deliver data and/or share a TXOP. The R-AP 102-*a* may receive a BA frame 306 responsive to the announcement frame 304. In some implementations, the R-AP 102-*a* may receive the BA frame 306 from the S-AP 102-*b*. The S-AP 102-*b* may transmit an announcement frame 308 and may receive a BA frame 310 responsive to the announcement frame 308. In some implementations, the S-AP 102-*b* may receive the BA frame 310 from the S-AP 102-*c*. In some implementations, the S-AP 102-*b* may transmit the announcement frame 308 (and receive any responsive signaling) during a TXOP shared by the R-AP 102-*a* via the announcement frame 304. In such examples, the R-AP 102-*a* may receive a return frame 312. The R-AP 102-*a* may receive the return frame 312 from the S-AP 102-*b* and the return frame 312 may indicate, to the R-AP 102-*a*, that the S-AP 102-*b* has completed its use of the shared TXOP and indicate a returning of the shared TXOP back to the R-AP 102-*a*.

In accordance with the frame exchanges associated with the announcement frame 304 and the announcement frame 308, the R-AP 102-*a* may transmit one or more data frames 314. In some implementations, the R-AP 102-*a* may transmit data via the one or more data frames 314 that is associated with a specific flow, such as a specific flow between the R-AP 102-*a* and the STA 104. To facilitate a timely relay of the data to the STA 104, the R-AP 102-*a* may transmit, for example, an RTS frame 316 associated with sharing a TXOP of the R-AP 102-*a* with the S-AP 102-*b*. Although described in the example of the RTS frame 316, the R-AP 102-*a* may additionally or alternatively use any other frame transmission to share a TXOP of the R-AP 102-*a* with the S-AP 102-b. The R-AP 102-a may receive a CTS frame 318 responsive to the RTS frame 316. In some implementations, the S-AP 102-b may transmit the CTS frame 318 to acknowledge the RTS frame 316 and confirm that the S-AP 102-b is to use the shared TXOP. As illustrated in the example of the communication timeline 300, the shared TXOP may include a time duration 342.

In some implementations, the RTS frame 316 (or any other frame the R-AP 102-a uses to share a TXOP with the S-AP 102-b) may include an identifier corresponding to the specific flow between the R-AP 102-a and the STA 104. As such, the S-AP 102-b may determine whether to use the shared TXOP on top of an overlapping flow-specific sequence of time slots. In some implementations, the S-AP 102-b may determine to use the shared TXOP on top of the overlapping flow-specific sequence of time slots if both the shared TXOP and the sequence of time slots are for delivery of data associated with the same flow. Otherwise, the S-AP 102-b may refrain from using the shared TXOP (or may prioritize one of the shared TXOP or the sequence of time slots).

In accordance with obtaining channel access during the shared TXOP, the S-AP 102-b may transmit one or more data frames 320. In some implementations, the one or more data frames 320 may be examples of relayed versions of the one or more data frames 314. The one or more data frames 320 may include data associated with the specific flow between the R-AP 102-a and the STA 104. In implementations in which the S-AP 102-b uses the flow-specific TXOP sharing in combination with the flow-specific sequence of time slots, the S-AP 102-b may transmit the one or more data frames 320 ignoring any channel access rules associated with the flow-specific sequence of time slots. For example, the S-AP 102-b may transmit the one or more data frames 320 prior to the time epoch 302-b. As illustrated in the example of the communication timeline 300, the S-AP 102-b may ignore channel access rules associated with the flow-specific sequence of time slots for a time duration 344.

In accordance with transmitting the one or more data frames 320, the S-AP 102-b may transmit an RTS frame 322 (or any other frame capable of indicating TXOP sharing) to further share the TXOP with the S-AP 102-c. The S-AP 102-b may receive a CTS frame 324 responsive to the RTS frame 322. For example, the S-AP 102-c may transmit the CTS frame 324 to acknowledge the RTS frame 322 and confirm that the S-AP 102-c is to use the shared TXOP.

In some implementations, the RTS frame 322 (or any other frame the S-AP 102-b uses to share a TXOP with the S-AP 102-c) may include the identifier corresponding to the specific flow between the R-AP 102-a and the STA 104. As such, the S-AP 102-c may determine whether to use the shared TXOP on top of an overlapping flow-specific sequence of time slots. In some implementations, the S-AP 102-c may determine to use the shared TXOP on top of the overlapping flow-specific sequence of time slots if both the shared TXOP and the sequence of time slots are for delivery of data associated with the same flow. Otherwise, the S-AP 102-c may refrain from using the shared TXOP (or may prioritize one of the shared TXOP or the sequence of time slots).

In accordance with obtaining channel access during the shared TXOP, the S-AP 102-c may transmit one or more data frames 326. In some implementations, the one or more data frames 326 may be examples of relayed versions of the one or more data frames 320. The one or more data frames 326 may include data associated with the specific flow between the R-AP 102-a and the STA 104. In implementations in which the S-AP 102-c uses the flow-specific TXOP sharing in combination with the flow-specific sequence of time slots, the S-AP 102-c may transmit the one or more data frames 326 ignoring any channel access rules associated with the flow-specific sequence of time slots. For example, the S-AP 102-c may transmit the one or more data frames 326 prior to the time epoch 302-c. As illustrated in the example of the communication timeline 300, the S-AP 102-c may ignore channel access rules associated with the flow-specific sequence of time slots for a time duration 346.

In accordance with transmitting the one or more data frames 326, the S-AP 102-c may transmit a return frame 328 to indicate, to the S-AP 102-b, that the S-AP 102-c has completed its use of the shared TXOP (such as has completed delivery of the one or more data frames 326 to the STA 104). The S-AP 102-b may transmit an RTS frame 330 and receive (such as from the S-AP 102-c) a CTS frame 332 responsive to the RTS frame 330.

In some aspects, the S-AP 102-c may further transmit one or more data frames 334 and may perform an RTS/CTS frame exchange with the STA 104. For example, the S-AP 102-c may transmit an RTS frame 336 and may receive (such as from the STA 104) a CTS frame 338 responsive to the RTS frame 336. In some implementations, the RTS/CTS frame exchange with the STA 104 may share a TXOP (such as a TXOP of the S-AP 102-c or the originally shared TXOP of the R-AP 102-a) with the STA 104.

The STA 104 may transmit one or more data frames 340 to the S-AP 102-c (a serving AP 102 for the STA 104) and, in some implementations, each of the STA 104, the S-AP 102-c, and the S-AP 102-b may transmit, in turn one or more return frames to release the shared TXOP back upstream. For example, in accordance with (such as after) receiving the one or more data frames 340, the S-AP 102-c may receive a return frame from the STA 104. In accordance with receiving the return frame, the S-AP 102-c may transmit a return frame to the S-AP 102-b and the S-AP 102-b may in turn transmit a return frame to the R-AP 102-a. As such, the downstream wireless communication devices may return the shared TXOP to the R-AP 102-a to complete the flow-specific TXOP sharing sequence.

Figure 4:
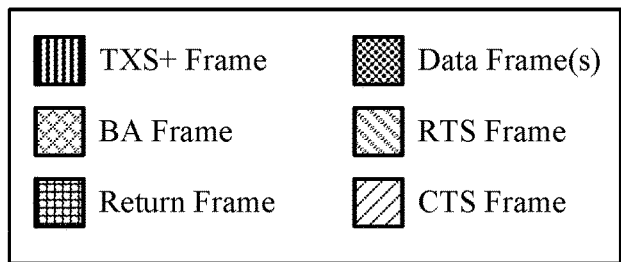
Figure 4:
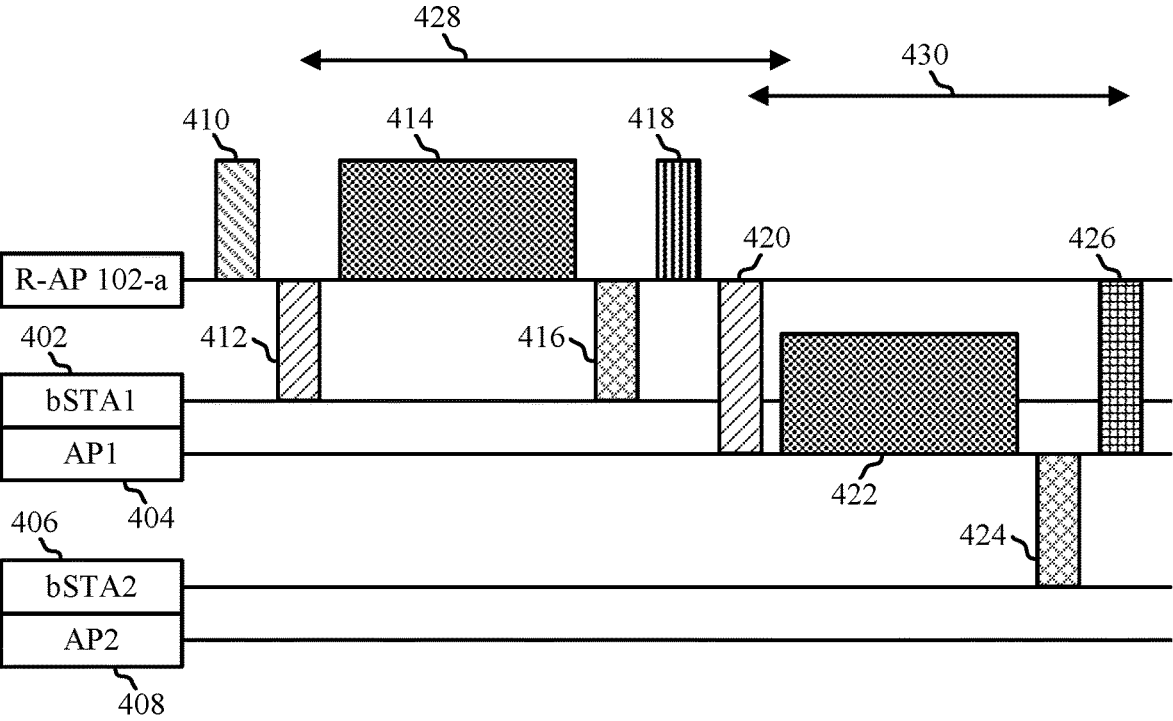

FIG. 4 shows an example communication timeline 400 that supports back-to-back transmissions via a multi-hop relay path using flow-specific resource reservation according to some aspects of the present disclosure. The communication timeline 400 illustrates communication between the R-AP 102-a, the S-AP 102-b, and the S-AP 102-c, which may be examples of corresponding devices as illustrated by and described with reference to FIG. 2, each of which may be an example of a wireless communication device. The S-AP 102-b may be associated with (such as have components associated with) a bSTA functionality 402 (or a bSTA1 functionality) and an AP functionality 404 (or an AP1 functionality) and the S-AP 102-c may be associated with (such as have components associated with) a bSTA functionality 406 (or a bSTA2 functionality) and an AP functionality 408 (or an AP2 functionality). In some implementations, the wireless communication devices of the communication timeline 400 may employ flow-specific TXOP sharing in combination with a flow-specific sequence of time slots (such as a flow-specific TDMA series) and may apply a coordinated TDMA (C-TDMA) transmission sequence via a downlink signaling path.

In accordance with example implementations of the present disclosure, one or more wireless communication devices may perform or participate in signaling mechanisms associated with a shared TXOP initiation according to which TXOP sharing (such as flow-specific TXOP sharing on top of a flow-specific sequence of time slots) may be initiated by any AP 102 on a relay path (such as a mesh end-to-end path). Such a TXOP sharing AP 102 may be the R-AP 102-*a*, the S-AP 102-*b*, or the S-AP 102-*c* (any AP 102) due to the use of C-TDMA (instead of, for example, peer-to-peer).

In accordance with the downlink C-TDMA transmission sequence illustrated by the communication timeline 400, the R-AP 102-*a* may transmit an RTS frame 410 and may receive, from the bSTA functionality 402 of the S-AP 102-*b*, a CTS frame 412. In accordance with receiving the CTS frame 412, the R-AP 102-*a* may transmit one or more data frames 414 including downlink data associated with a specific flow, such as a flow between the R-AP 102-*a* and a STA 104. The bSTA functionality 402 of the S-AP 102-*b* may transmit a BA frame 416, which may provide feedback associated with reception of the one or more data frames 414 at the S-AP 102-*b*. The R-AP 102-*a* may transmit a TXS+ frame 418, which may refer to any frame via which the R-AP 102-*a* (or any other wireless communication device) may indicate TXOP sharing to an upstream or downstream wireless communication device.

In some implementations, the R-AP 102-*a* may transmit the TXS+ frame 418 in accordance with finishing its downlink data transmission sequence, such as within a time duration 428. In other words, and more generally, an upstream AP 102 may perform a downlink data transmission sequence and may trigger to share a remaining TXOP duration with a downstream AP 102 of the same flow to which a (current or next) TDMA slot is designated.

The AP functionality 404 of the S-AP 102-*b* may transmit a CTS frame 420 responsive to (such as to acknowledge) the TXS+ frame 418. In accordance with obtaining channel access during the shared TXOP, the S-AP 102-*b* may transmit, via the AP functionality 404 of the S-AP 102-*b*, one or more data frames 422 including downlink data associated with the specific flow. The one or more data frames 422 may be relayed versions of the one or more data frames 414. The S-AP 102-*c* may receive the one or more data frames 422 via the bSTA functionality 406 of the S-AP 102-*c* an may transmit a BA frame 424 associated with the one or more data frames 422. In accordance with receiving the BA frame 424, the S-AP 102-*b* (such as the AP functionality 404 of the S-AP 102-*b*) may transmit a return frame 426 to return the shared TXOP back to the R-AP 102-*a*. As such, and as illustrated by the communication timeline 400, the S-AP 102-*b* may complete (such as finish) its downlink data transmission sequence within a time duration 430 and may subsequently return any remaining TXOP duration to the R-AP 102-*a* (the TXOP owner in the example downlink C-TDMA sequence of the communication timeline 400).

Figure 5:
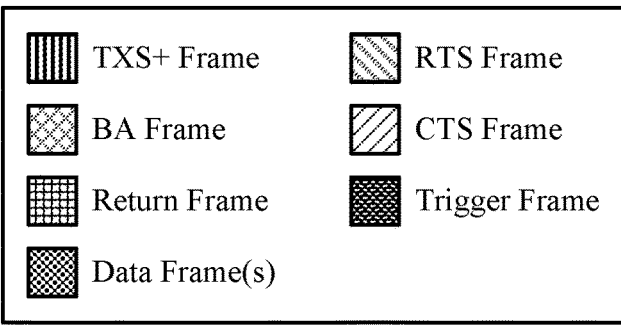
Figure 5:
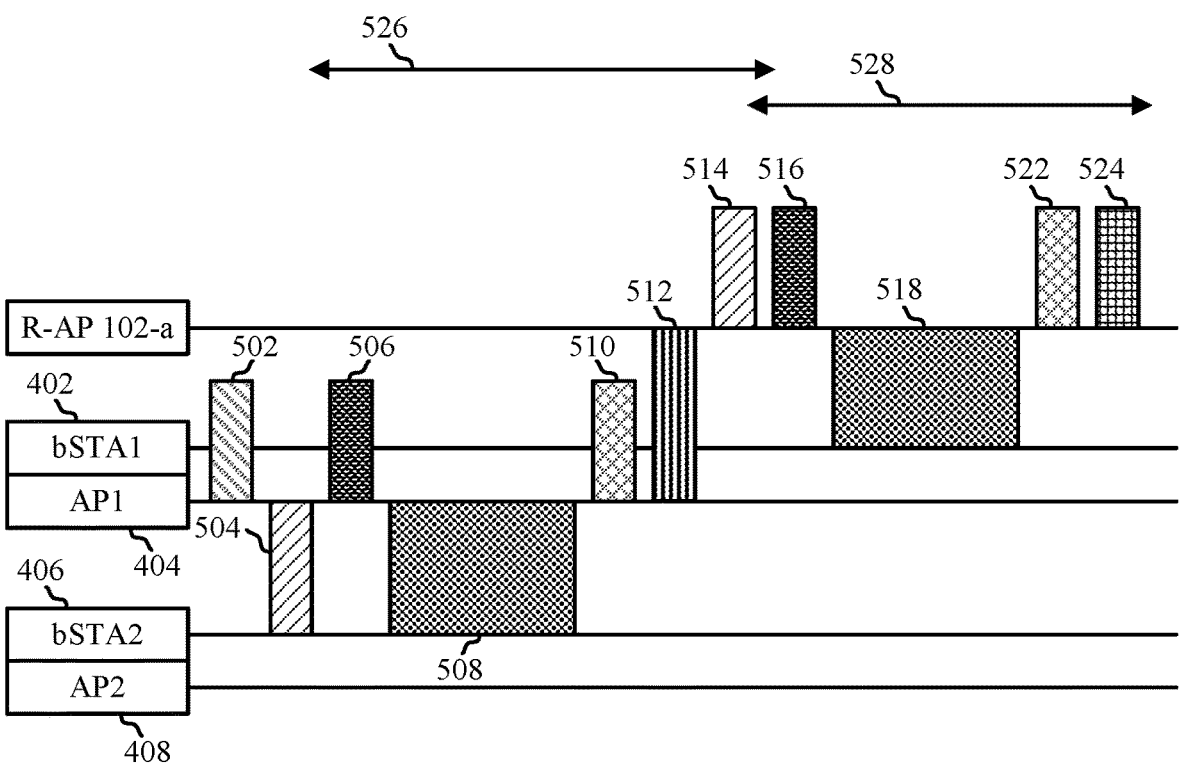

FIG. 5 shows an example communication timeline 500 that supports back-to-back transmissions via a multi-hop relay path using flow-specific resource reservation according to some aspects of the present disclosure. The communication timeline 500 illustrates communication between the R-AP 102-*a*, the S-AP 102-*b*, and the S-AP 102-*c*, which may be examples of corresponding devices as illustrated by and described with reference to FIG. 2, each of which may be an example of a wireless communication device. The S-AP 102-*b* may be associated with (such as have components associated with) a bSTA functionality 402 (or a bSTA1 functionality) and an AP functionality 404 (or an AP1 functionality) and the S-AP 102-*c* may be associated with (such as have components associated with) a bSTA functionality 406 (or a bSTA2 functionality) and an AP functionality 408 (or an AP2 functionality). In some implementations, the wireless communication devices of the communication timeline 500 may employ flow-specific TXOP sharing in combination with a flow-specific sequence of time slots (such as a flow-specific TDMA series) and may apply a C-TDMA transmission sequence via an uplink signaling path.

In accordance with the uplink C-TDMA transmission sequence illustrated by the communication timeline 500, the AP functionality 404 of the S-AP 102-*b* may transmit an RTS frame 502 and the bSTA functionality 406 of the S-AP 102-*c* may respond by transmitting a CTS frame 504 to the AP functionality 404 of the S-AP 102-*b*. In accordance with such an RTS/CTS frame exchange between the S-AP 102-*b* and the S-AP 102-*c* the AP functionality 404 of the S-AP 102-*b* may transmit a trigger frame 506 to solicit uplink data from the S-AP 102-*c* (such as from the bSTA functionality 406 of the S-AP 102-*c*). The bSTA functionality 406 of the S-AP 102-*c* may transmit one or more data frames 508 including the solicited uplink data. Such one or more data frames 508 may include one or more uplink trigger-based (TB) PPDUs.

The AP functionality 404 of the S-AP 102-*b* may transmit a BA frame 510 associated with (such as providing feedback for) the one or more data frames 508 and, in some implementations, may transmit a TXS+ frame 512 to share a TXOP of the S-AP 102-*b* with the R-AP 102-*a*. In other words, and more generally, a downstream AP 102 may finish an uplink TB PPDU transmission sequence and the downstream AP 102 may trigger to share a remaining TXOP duration with an upstream AP 102 of the flow to which a (current or next) TDMA slot is designated. As illustrated in the example of the communication timeline 500, the S-AP 102-*b* may complete its TB uplink sequence with the S-AP 102-*c* within a time duration 526.

The R-AP 102-*a* may transmit a CTS frame 514 to acknowledge and confirm the TXS+ frame 512 and may transmit a trigger frame 516 to solicit uplink data from the S-AP 102-*b*. In accordance with receiving the trigger frame 516, the S-AP 102-*b* (such as via the bSTA functionality 402 of the S-AP 102-*b*) may transmit one or more data frames 518 including the solicited uplink data. In some aspects, the one or more data frames 518 may be relayed versions of the one or more data frames 508 and may include data associated with the specific flow.

The R-AP 102-*a* may receive the one or more data frames 518 and may transmit a BA frame 522 associated with (such as providing feedback for) the one or more data frames 518. The R-AP 102-*a*, in accordance with receiving the solicited uplink data via the one or more data frames 518, may transmit a return frame 524 indicating a returning of the shared TXOP back to the S-AP 102-*b* (the original TXOP owner). For example, the R-AP 102-*a* may transmit the return frame 524 after completing an uplink data transmission sequence with the S-AP 102-*b*, which the R-AP 102-*a* and the S-AP 102-*b* may complete within a time duration 528.

Figure 6:
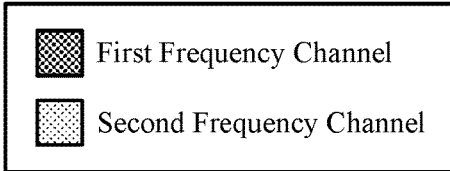
FIG. 6 shows an example channel reservation scheme that supports back-to-back transmissions via a multi-hop relay path using flow-specific resource reservation according to some aspects of the present disclosure.
Figure 6:
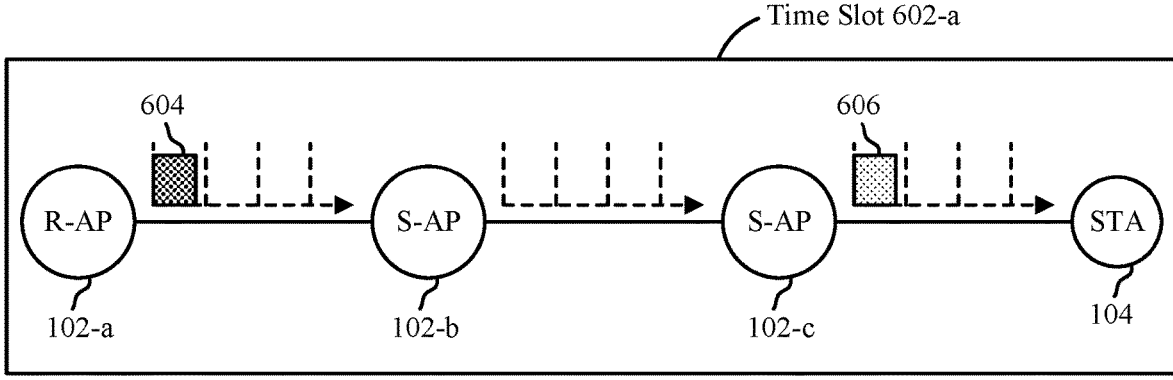
Figure 6:
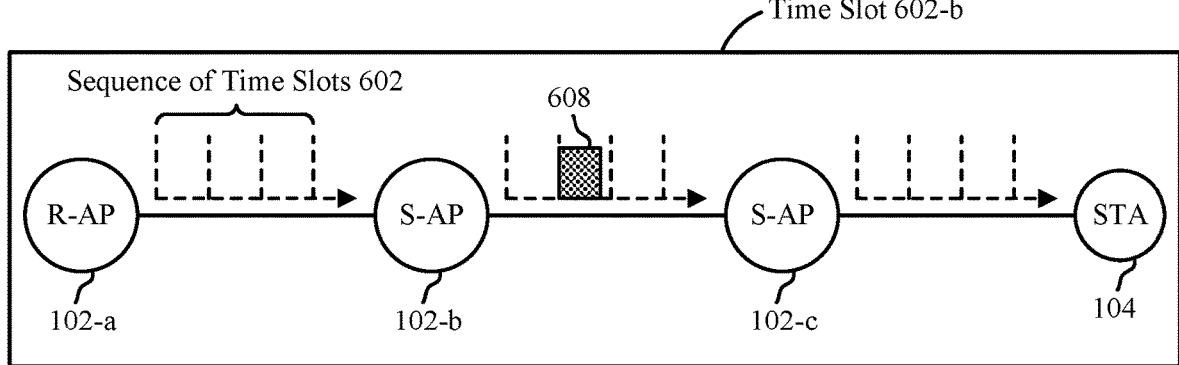
Figure 6:
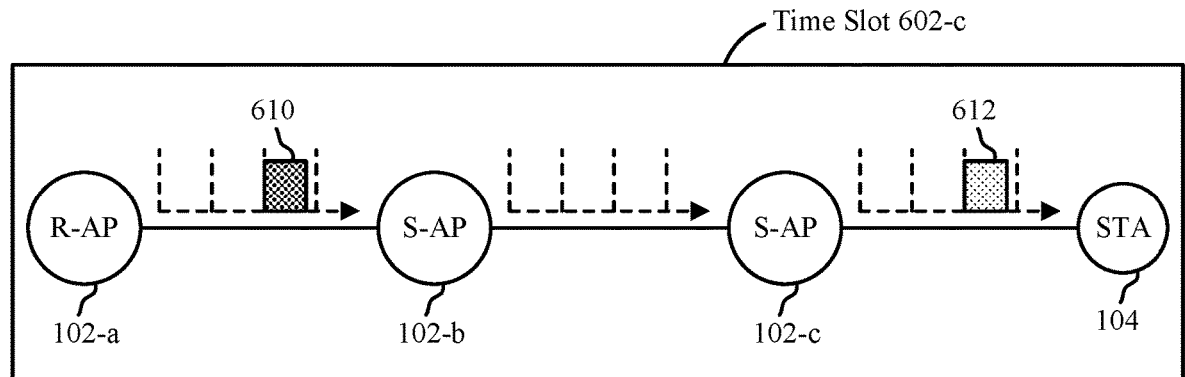

FIG. 6 shows an example channel reservation scheme 600 that supports back-to-back transmissions via a multi-hop relay path using flow-specific resource reservation according to some aspects of the present disclosure. The channel reservation scheme 600 may facilitate orthogonal channel reservation for hidden terminal hops in combination with a flow-specific sequence of TDMA slots. For example, the channel reservation scheme 600 illustrates channel usage for communication between the R-AP 102-*a*, the S-AP 102-*b*, the S-AP 102-*c*, and the STA 104, which may be examples of corresponding devices as illustrated by and described with reference to FIGS. 2-5, each of which may be an example of a wireless communication device.

In some deployment scenarios, APs 102 that are hidden terminals to each other may not be aware of TDMA slot assignments from, for example, C-R-TWT advertisements. As such, two or more APs 102 that are hidden terminals to each other may access the channel during TDMA slots of each other without knowing that such channel access might cause interference. Further, in some systems, an AP 102 that does not own a TDMA slot and is aware of power interference to a hidden terminal node may access the channel using relaxed EDCA, which may still cause data transmission failure.

Accordingly, in some implementations, one or more wireless communication devices may support a mechanism according to which a frequency channel is designated to a TDMA slot for an AP 102 assigned to a specific flow (or multiple specific flows) on a specific hop of a relay path (such as an end-to-end mesh path) to prevent hidden terminal transmissions from corrupting reception of the specific flow (which may be a low latency or an otherwise latency sensitive flow). In other words, each hop of a multi-hop relay path may be associated with a specific frequency channel along with a TDMA schedule such that an AP 102 corresponding to that hop uses (such as communicates via) the specific frequency channel when transmitting both during and outside of its TDMA schedule. In some aspects, such operation may be referred to or understood as multi-primary channel operation in combination with a flow-specific TDMA series. In some implementations, different multi-primary channels may be assigned (by a system controller or in accordance with inter-AP coordination) for different hops of an end-to-end mesh path of a specific flow (or multiple specific flows) for the reserved TDMA slots. In some implementations, transmissions that are (at least) two hops away may use different channels.

For example, as illustrated in the example of FIG. 6, the channel reservation scheme 600 may be applied to a sequence of time slots 602 including a first time slot 602-*a*, a second time slot 602-*b*, and a third time slot 602-*c* and the R-AP 102-*a* and the S-AP 102-*c* (devices that are two hops away from each other) may use different channels. For instance, during the first time slot 602-*a*, the R-AP 102-*a* may perform a transmission 604 using a first frequency channel and the S-AP 102-*c* may perform a transmission 606 using a second frequency channel different from (such as orthogonal to) the first frequency channel. In other words, the S-AP 102-*c* may use a different channel in the first time slot 602-*c* than the R-AP 102-*a* to prevent any hidden terminal impact on the R-AP 102-*a*.

The S-AP 102-*b* may perform a transmission 608 during the time slot 602-*b*. In some aspects, the transmission 608 may be a relayed version of the transmission 606 in accordance with the (flow-specific) sequence of time slots 602. In some aspects, the S-AP 102-*b* may use the same channel as the S-AP 102-*c* and let a carrier-sense multiple access (CSMA) protocol resolve channel access contention between the S-AP 102-*b* and the S-AP 102-*c*. During the time slot 602-*c*, the R-AP 102-*a* may perform a transmission 610 using the first frequency channel and the S-AP 102-*c* may perform a transmission 612 using the second frequency channel. In other words, the S-AP 102-*c* may use a different channel tan the R-AP 102-*a* in the time slot 602-*c* to prevent any hidden terminal impact from the R-AP 102-*a*.

Figure 7:
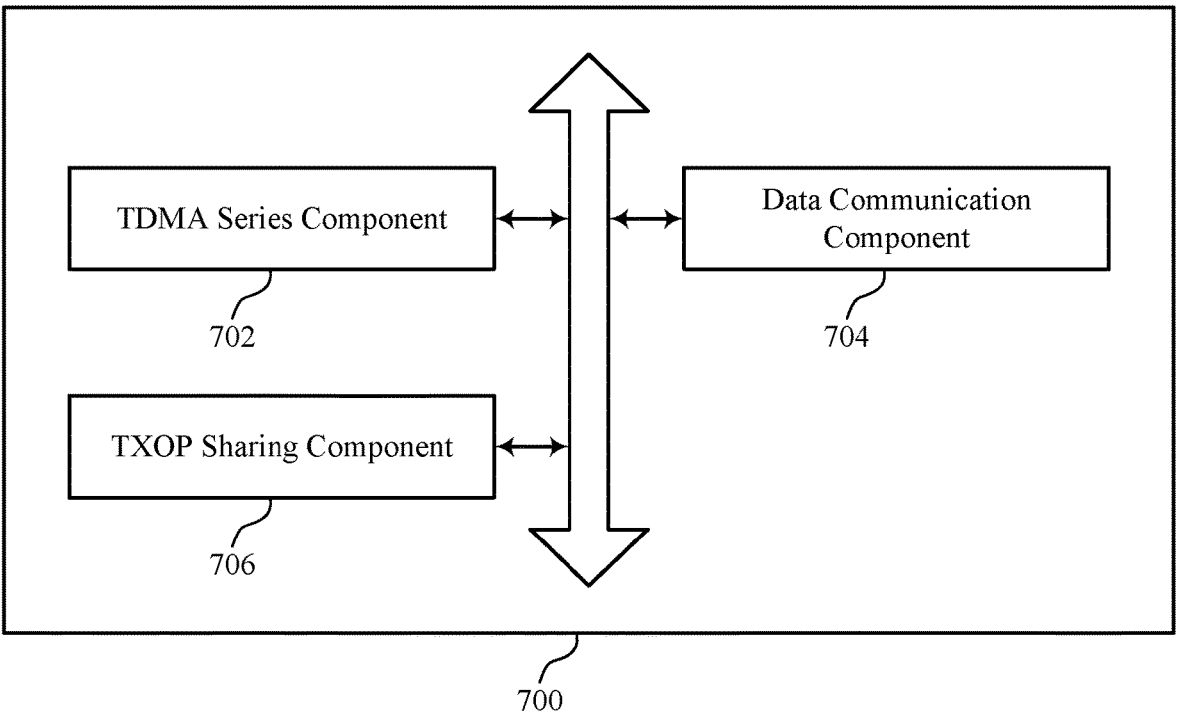
FIG. 7 shows a block diagram of an example wireless communication device that supports back-to-back transmissions via a multi-hop relay path using flow-specific resource reservation according to some aspects of the present disclosure.

FIG. 7 shows a block diagram of an example wireless communication device 700 that supports back-to-back transmissions via a multi-hop relay path using flow-specific resource reservation. In various examples, the wireless communication device 700 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "at least one processor"); one or more radios (collectively "at least one radio"); and one or more memories or memory blocks (collectively "at least one memory"). In some implementations, the at least one processor may include multiple processors, and the at least one memory may include multiple memories. One or more of the multiple processors may be coupled with one or more of the multiple memories which may, individually or collectively, be configured to perform various functions described herein (as part of a processing system).

In some implementations, the wireless communication device 700 can be a device for use in an AP or STA, such as AP or STA described with reference to FIGS. 1-6. In some other implementations, the wireless communication device 700 can be an AP or STA that includes such a chip, SoC, chipset, package or device as well as multiple antennas. The wireless communication device 700 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 700 also includes or can be coupled with at least one application processor which may be further coupled with at least one memory. In some implementations, the wireless communication device 700 further includes at least one external network interface that enables communication with a core network or backhaul network to gain access to external networks including the Internet.

The wireless communication device 700 includes a TDMA series component 702, a data communication component 704, and a TXOP sharing component 706. Portions of one or more of the TDMA series component 702, the data communication component 704, and the TXOP sharing component 706 may be implemented at least in part in hardware or firmware. For example, one or more of the TDMA series component 702, the data communication component 704, and the TXOP sharing component 706 may be implemented at least in part by at least one modem. In some implementations, at least some of the TDMA series component 702, the data communication component 704, and the TXOP sharing component 706 are implemented at least in part by at least one processor and as software stored in at least one memory. For example, portions of one or more of the TDMA series component 702, the data communication component 704, and the TXOP sharing component 706 can be implemented as non-transitory instructions (or "code") executable by the at least one processor to perform the functions or operations of the respective module.

In some implementations, the at least one processor may be a component of a processing system. A processing system may generally refer to a system or series of machines or components that receives inputs and processes the inputs to produce a set of outputs (which may be passed to other systems or components of, for example, the wireless communication device 700). For example, a processing system of the wireless communication device 700 may refer to a system including the various other components or subcomponents of the wireless communication device 700, such as the at least one processor, or at least one transceiver, or at least one communications manager, or other components or combinations of components of the wireless communication device 700. The processing system of the wireless communication device 700 may interface with other components of the wireless communication device 700, and may process information received from other components (such as inputs or signals) or output information to other components. For example, a chip or modem of the wireless communication device 700 may include a processing system, a first interface to output information and a second interface to obtain information. In some implementations, the first interface may refer to an interface between the processing system of the chip or modem and a transmitter, such that the wireless communication device 700 may transmit information output from the chip or modem. In some implementations, the second interface may refer to an interface between the processing system of the chip or modem and a receiver, such that the wireless communication device 700 may obtain information or signal inputs, and the information may be passed to the processing system. A person having ordinary skill in the art will readily recognize that the first interface also may obtain information or signal inputs, and the second interface also may output information or signal outputs.

The wireless communication device 700 may support wireless communication at a first wireless communication device in accordance with examples as disclosed herein. The TDMA series component 702 is capable of, configured to, or operable to support a means for receiving information associated with a sequence of time slots, where the sequence of time slots corresponds to a traffic flow associated with a multi-hop relay path. The data communication component 704 is capable of, configured to, or operable to support a means for transmitting, during a transmission opportunity of the first wireless communication device, data associated with the traffic flow. The TXOP sharing component 706 is capable of, configured to, or operable to support a means for transmitting a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

In some implementations, the TDMA series component 702 is capable of, configured to, or operable to support a means for receiving a channel access priority mapping associated with the sequence of time slots, where the channel access priority mapping indicates that each respective wireless communication device of the multi-hop relay path has channel access priority during a respective time slot of the sequence of time slots, and where the sharing of the transmission opportunity supersedes the channel access priority mapping in accordance with the frame indicating the identifier corresponding to the traffic flow.

In some implementations, the TXOP sharing component 706 is capable of, configured to, or operable to support a means for transmitting the frame to the second wireless communication device in accordance with the multi-hop relay path, where, in accordance with the channel access priority mapping associated with the sequence of time slots, the first wireless communication device is scheduled for a first time slot of the sequence of time slots and the second wireless communication device is scheduled for a second time slot of the sequence of time slots immediately subsequent to the first time slot.

In some implementations, the TXOP sharing component 706 is capable of, configured to, or operable to support a means for transmitting the frame to indicate, to the second wireless communication device, that the data associated with the traffic flow is to be relayed in accordance with the multi-hop relay path during the transmission opportunity.

In some implementations, the data communication component 704 is capable of, configured to, or operable to support a means for receiving, from the second wireless communication device during the transmission opportunity, a trigger frame soliciting the data associated with the traffic flow, where transmitting the data is in association with receiving the trigger frame.

In some implementations, the data communication component 704 is capable of, configured to, or operable to support a means for transmitting, to a third wireless communication device, a second trigger frame soliciting the data associated with the traffic flow. In some implementations, the data communication component 704 is capable of, configured to, or operable to support a means for receiving the data associated with the traffic flow from the third wireless communication device in association with transmitting the second trigger frame, where transmitting the frame indicating the sharing of the transmission opportunity with the second wireless communication device is in association with receiving the data from the third wireless communication device.

In some implementations, the TDMA series component 702 is capable of, configured to, or operable to support a means for receiving the information associated with the sequence of time slots from a controller of the multi-hop relay path.

In some implementations, one or more channel access rules associated with the sequence of time slots are inapplicable during the transmission opportunity shared by the first wireless communication device in accordance with the frame indicating the identifier corresponding to the traffic flow and the sequence of time slots also corresponding to the traffic flow.

In some implementations, the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels.

In some implementations, the frame is an allocation request frame or a trigger frame.

In some implementations, the frame indicates the identifier corresponding to the traffic flow via an information element.

In some implementations, the sequence of time slots is associated with a sequence of flow-specific back-to-back time domain multiple access slot reservations.

Additionally, or alternatively, the wireless communication device 700 may support wireless communication at a first wireless communication device in accordance with examples as disclosed herein. In some implementations, the TDMA series component 702 is capable of, configured to, or operable to support a means for receiving information associated with a sequence of time slots, where the sequence of time slots corresponds to a traffic flow associated with a multi-hop relay path. In some implementations, the TXOP sharing component 706 is capable of, configured to, or operable to support a means for receiving a frame indicating a sharing of a transmission opportunity with the first wireless communication device and indicating an identifier corresponding to the traffic flow. In some implementations, the data communication component 704 is capable of, configured to, or operable to support a means for communicating, during the transmission opportunity, data associated with the traffic flow in accordance with the frame indicating the identifier corresponding to the traffic flow.

In some implementations, the TDMA series component 702 is capable of, configured to, or operable to support a means for receiving a channel access priority mapping associated with the sequence of time slots, where the channel access priority mapping indicates that each respective wireless communication device of the multi-hop relay path has channel access priority during a respective time slot of the sequence of time slots, and where the sharing of the transmission opportunity supersedes the channel access priority mapping in accordance with the frame indicating the identifier corresponding to the traffic flow.

In some implementations, the TXOP sharing component 706 is capable of, configured to, or operable to support a means for receiving the frame from a second wireless communication device in accordance with the multi-hop relay path, where, in accordance with the channel access priority mapping associated with the sequence of time slots, the first wireless communication device is scheduled for a first time slot of the sequence of time slots and the second wireless communication device is scheduled for a second time slot of the sequence of time slots immediately prior to the first time slot.

In some implementations, the data communication component 704 is capable of, configured to, or operable to support a means for receiving the data associated with the traffic flow from a second wireless communication device. In some implementations, the data communication component 704 is capable of, configured to, or operable to support a means for transmitting the data during the transmission opportunity in association with a relaying of the data from the second wireless communication device to a third wireless communication device.

In some implementations, the data communication component 704 is capable of, configured to, or operable to support a means for transmitting, in association with receiving the frame indicating the sharing of the transmission opportunity, a trigger frame soliciting the data associated with the traffic flow. In some implementations, the data communication component 704 is capable of, configured to, or operable to support a means for receiving the data in association with transmitting the trigger frame.

In some implementations, the TDMA series component 702 is capable of, configured to, or operable to support a means for receiving the information associated with the sequence of time slots from a controller of the multi-hop relay path.

In some implementations, one or more channel access rules associated with the sequence of time slots are inapplicable during the transmission opportunity in accordance with the frame indicating the identifier corresponding to the traffic flow and the sequence of time slots also corresponding to the traffic flow.

In some implementations, the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels.

In some implementations, the frame is an allocation request frame or a trigger frame.

In some implementations, the frame indicates the identifier corresponding to the traffic flow via an information element.

In some implementations, the sequence of time slots is associated with a sequence of flow-specific back-to-back time domain multiple access slot reservations.

Additionally, or alternatively, the wireless communication device 700 may support wireless communication at a first wireless communication device in accordance with examples as disclosed herein. In some implementations, the TDMA series component 702 is capable of, configured to, or operable to support a means for receiving information associated with a sequence of time slots, where the sequence of time slots corresponds to a traffic flow associated with a multi-hop relay path, and where the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels. In some implementations, the data communication component 704 is capable of, configured to, or operable to support a means for transmitting, via a first frequency channel during a first time slot of the sequence of time slots in accordance with the frequency channel mapping, data associated with the traffic flow.

In some implementations, the TDMA series component 702 is capable of, configured to, or operable to support a means for receiving a channel access priority mapping associated with the sequence of time slots, where the channel access priority mapping indicates that each respective wireless communication device of the multi-hop relay path has channel access priority during a respective time slot of the sequence of time slots.

In some implementations, the channel access priority mapping indicates a relatively highest channel access priority for the first wireless communication device for the first time slot and indicates a relatively highest channel access priority for a second wireless communication device for a second time slot of the sequence of time slots, the frequency channel mapping indicating the first frequency channel for the first wireless communication device and a second frequency channel for the second wireless communication device.

In some implementations, the first frequency channel and the second frequency channel are different channels in accordance with the first wireless communication device and the second wireless communication device being at least two hops away from each other in accordance with the multi-hop relay path.

In some implementations, the TDMA series component 702 is capable of, configured to, or operable to support a means for receiving the information associated with the sequence of time slots from a controller of the multi-hop relay path.

In some implementations, the frequency channel mapping is associated with multi-primary channel operation along the multi-hop relay path.

In some implementations, the frequency channel mapping indicates different multi-primary channels for different hops of the multi-hop relay path.

In some implementations, the sequence of time slots is associated with a sequence of flow-specific back-to-back time domain multiple access slot reservations.

FIG. 8 shows a flowchart illustrating an example process 800 that supports back-to-back transmissions via a multi-hop relay path using flow-specific resource reservation in accordance with one or more aspects of the present disclosure. The operations of the process 800 may be implemented by an AP or a STA or its components as described herein. For example, the operations of the process 800 may be performed by a wireless communication device 700 as described with reference to FIG. 7. In some implementations, a first wireless communication device may execute a set of instructions to control the functional elements of the first wireless communication device to perform the described functions. Additionally, or alternatively, the first wireless communication device may perform aspects of the described functions using special-purpose hardware.

In some implementations, in block 802, the first wireless communication device may receive information associated with a sequence of time slots, where the sequence of time slots corresponds to a traffic flow associated with a multi-hop relay path. The operations of block 802 may be performed in accordance with examples as disclosed herein. In some implementations, aspects of the operations of block 802 may be performed by a TDMA series component 702 as described with reference to FIG. 7.

In some implementations, in block 804, the first wireless communication device may transmit, during a transmission opportunity of the first wireless communication device, data associated with the traffic flow. The operations of block 804 may be performed in accordance with examples as disclosed herein. In some implementations, aspects of the operations of block 804 may be performed by a data communication component 704 as described with reference to FIG. 7.

In some implementations, in block 806, first wireless communication device may transmit a frame indicating a sharing of the transmission opportunity with a second wireless communication device of the multi-hop relay path and indicating, in accordance with the transmission opportunity at least partially overlapping with the sequence of time slots, an identifier corresponding to the traffic flow. The operations of block 806 may be performed in accordance with examples as disclosed herein. In some implementations, aspects of the operations of block 806 may be performed by a TXOP sharing component 706 as described with reference to FIG. 7.

FIG. 9 shows a flowchart illustrating an example process 900 that supports back-to-back transmissions via a multi-hop relay path using flow-specific resource reservation in accordance with one or more aspects of the present disclosure. The operations of the process 900 may be implemented by an AP or a STA or its components as described herein. For example, the operations of the process 900 may be performed by a wireless communication device 700 as described with reference to FIG. 7. In some implementations, a first wireless communication device may execute a set of instructions to control the functional elements of the first wireless communication device to perform the described functions. Additionally, or alternatively, the first wireless communication device may perform aspects of the described functions using special-purpose hardware.

In some implementations, in block 902, the first wireless communication device may receive information associated with a sequence of time slots, where the sequence of time slots corresponds to a traffic flow associated with a multi-hop relay path. The operations of block 902 may be performed in accordance with examples as disclosed herein. In some implementations, aspects of the operations of block 902 may be performed by a TDMA series component 702 as described with reference to FIG. 7.

In some implementations, in block 904, the first wireless communication device may receive a frame indicating a sharing of a transmission opportunity with the first wireless communication device and indicating an identifier corresponding to the traffic flow. The operations of block 904 may be performed in accordance with examples as disclosed herein. In some implementations, aspects of the operations of block 904 may be performed by a TXOP sharing component 706 as described with reference to FIG. 7.

In some implementations, in block 906, the first wireless communication device may communicate, during the transmission opportunity, data associate with the traffic flow in accordance with the frame indicating the identifier corresponding to the traffic flow. The operations of block 906 may be performed in accordance with examples as disclosed herein. In some implementations, aspects of the operations of block 906 may be performed by a data communication component 704 as described with reference to FIG. 7.

FIG. 10 shows a flowchart illustrating an example process 1000 that supports back-to-back transmissions via a multi-hop relay path using flow-specific resource reservation in accordance with one or more aspects of the present disclosure. The operations of the process 1000 may be implemented by an AP or a STA or its components as described herein. For example, the operations of the process 1000 may be performed by a wireless communication device 700 as described with reference to FIG. 7. In some implementations, a first wireless communication device may execute a set of instructions to control the functional elements of the first wireless communication device to perform the described functions. Additionally, or alternatively, the first wireless communication device may perform aspects of the described functions using special-purpose hardware.

In some implementations, in block 1002, the first wireless communication device may receive information associated with a sequence of time slots, where the sequence of time slots corresponds to a traffic flow associated with a multi-hop relay path, and where the information associated with the sequence of time slots indicates a frequency channel mapping associated with the multi-hop relay path, the frequency channel mapping indicating that each respective wireless communication device of the multi-hop relay path uses a respective frequency channel of a set of multiple frequency channels. The operations of block 1002 may be performed in accordance with examples as disclosed herein. In some implementations, aspects of the operations of block 1002 may be performed by a TDMA series component 702 as described with reference to FIG. 7.

In some implementations, in block 1004, the first wireless communication device may transmit, via a first frequency channel during a first time slot of the sequence of time slots in accordance with the frequency channel mapping, data associated with the traffic flow. The operations of block 1004 may be performed in accordance with examples as disclosed herein. In some implementations, aspects of the operations of block 1004 may be performed by a data communication component 704 as described with reference to FIG. 7.

Implementation examples are described in the following numbered clauses:

Clause 1: A method for wireless communication by a first wireless communication device, including: receiving information associated with a sequence of time slots, wherein the sequence of time slots corresponds to a traffic flow associated with a multi-hop relay path; transmitting, during a transmission opportunity of the first wireless communication device, data associated with the traffic flow; and transmitting a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

Clause 2: The method of clause 1, further including: receiving a channel access priority mapping associated with the sequence of time slots, wherein the channel access priority mapping indicates that each respective wireless communication device of the multi-hop relay path has channel access priority during a respective time slot of the sequence of time slots, and wherein the sharing of the transmission opportunity supersedes the channel access priority mapping in accordance with the frame indicating the identifier corresponding to the traffic flow.

Clause 3: The method of clause 2, further including: transmitting the frame to the second wireless communication device in accordance with the multi-hop relay path, wherein, in accordance with the channel access priority mapping associated with the sequence of time slots, the first wireless communication device is scheduled for a first time slot of the sequence of time slots and the second wireless communication device is scheduled for a second time slot of the sequence of time slots immediately subsequent to the first time slot.

Clause 4: The method of any of clauses 1-3, further including: transmitting the frame to indicate, to the second wireless communication device, that the data associated with the traffic flow is to be relayed in accordance with the multi-hop relay path during the transmission opportunity.

Clause 5: The method of any of clauses 1-4, further including: receiving, from the second wireless communication device during the transmission opportunity, a trigger frame soliciting the data associated with the traffic flow, wherein transmitting the data is in association with receiving the trigger frame.

Clause 6: The method of clause 5, further including: transmitting, to a third wireless communication device, a second trigger frame soliciting the data associated with the traffic flow; and receiving the data associated with the traffic flow from the third wireless communication device in association with transmitting the second trigger frame, wherein transmitting the frame indicating the sharing of the transmission opportunity with the second wireless communication device is in association with receiving the data from the third wireless communication device.

Clause 7: The method of any of clauses 1-6, further including: receiving the information associated with the sequence of time slots from a controller of the multi-hop relay path.

Clause 8: The method of any of clauses 1-7, wherein one or more channel access rules associated with the sequence of time slots are inapplicable during the transmission opportunity shared by the first wireless communication device in accordance with the frame indicating the identifier corresponding to the traffic flow and the sequence of time slots also corresponding to the traffic flow.

Clause 9: The method of any of clauses 1-8, wherein the information associated with the sequence of time slots indicates a frequency channel mapping associated with the multi-hop relay path, the frequency channel mapping indicating that each respective wireless communication device of the multi-hop relay path uses a respective frequency channel of a plurality of frequency channels.

Clause 10: The method of any of clauses 1-9, wherein the frame is an allocation request frame or a trigger frame.

Clause 11: The method of any of clauses 1-10, wherein the frame indicates the identifier corresponding to the traffic flow via an information element.

Clause 12: The method of any of clauses 1-11, wherein the sequence of time slots is associated with a sequence of flow-specific back-to-back time domain multiple access slot reservations.

Clause 13: A method for wireless communication by a first wireless communication device, including: receiving information associated with a sequence of time slots, wherein the sequence of time slots corresponds to a traffic flow associated with a multi-hop relay path; receiving a frame indicating a sharing of a transmission opportunity with the first wireless communication device and indicating an identifier corresponding to the traffic flow; and communicating, during the transmission opportunity, data associated with the traffic flow in accordance with the frame indicating the identifier corresponding to the traffic flow.

Clause 14: The method of clause 13, further including: receiving a channel access priority mapping associated with the sequence of time slots, wherein the channel access priority mapping indicates that each respective wireless communication device of the multi-hop relay path has channel access priority during a respective time slot of the sequence of time slots, and wherein the sharing of the transmission opportunity supersedes the channel access priority mapping in accordance with the frame indicating the identifier corresponding to the traffic flow.

Clause 15: The method of clause 14, further including: receiving the frame from a second wireless communication device in accordance with the multi-hop relay path, wherein, in accordance with the channel access priority mapping associated with the sequence of time slots, the first wireless communication device is scheduled for a first time slot of the sequence of time slots and the second wireless communication device is scheduled for a second time slot of the sequence of time slots immediately prior to the first time slot.

Clause 16: The method of any of clauses 13-15, further including: receiving the data associated with the traffic flow from a second wireless communication device; and transmitting the data during the transmission opportunity in association with a relaying of the data from the second wireless communication device to a third wireless communication device.

Clause 17: The method of any of clauses 13-16, further including: transmitting, in association with receiving the frame indicating the sharing of the transmission opportunity, a trigger frame soliciting the data associated with the traffic flow; and receiving the data in association with transmitting the trigger frame.

Clause 18: The method of any of clauses 13-17, further including: receiving the information associated with the sequence of time slots from a controller of the multi-hop relay path.

Clause 19: The method of any of clauses 13-18, wherein one or more channel access rules associated with the sequence of time slots are inapplicable during the transmission opportunity in accordance with the frame indicating the identifier corresponding to the traffic flow and the sequence of time slots also corresponding to the traffic flow.

Clause 20: The method of any of clauses 13-19, wherein the information associated with the sequence of time slots indicates a frequency channel mapping associated with the multi-hop relay path, the frequency channel mapping indicating that each respective wireless communication device of the multi-hop relay path uses a respective frequency channel of a plurality of frequency channels.

Clause 21: The method of any of clauses 13-20, wherein the frame is an allocation request frame or a trigger frame.

Clause 22: The method of any of clauses 13-21, wherein the frame indicates the identifier corresponding to the traffic flow via an information element.

Clause 23: The method of any of clauses 13-22, wherein the sequence of time slots is associated with a sequence of flow-specific back-to-back time domain multiple access slot reservations.

Clause 24: A method for wireless communication by a first wireless communication device, including: receiving information associated with a sequence of time slots, wherein the sequence of time slots corresponds to a traffic flow associated with a multi-hop relay path, and wherein the information associated with the sequence of time slots indicates a frequency channel mapping associated with the multi-hop relay path, the frequency channel mapping indicating that each respective wireless communication device of the multi-hop relay path uses a respective frequency channel of a plurality of frequency channels; and transmitting, via a first frequency channel during a first time slot of the sequence of time slots in accordance with the frequency channel mapping, data associated with the traffic flow.

Clause 25: The method of clause 24, further including: receiving a channel access priority mapping associated with the sequence of time slots, wherein the channel access priority mapping indicates that each respective wireless communication device of the multi-hop relay path has channel access priority during a respective time slot of the sequence of time slots.

Clause 26: The method of clause 25, wherein the channel access priority mapping indicates a relatively highest channel access priority for the first wireless communication device for the first time slot and indicates a relatively highest channel access priority for a second wireless communication device for a second time slot of the sequence of time slots, the frequency channel mapping indicating the first frequency channel for the first wireless communication device and a second frequency channel for the second wireless communication device.

Clause 27: The method of clause 26, wherein the first frequency channel and the second frequency channel are different channels in accordance with the first wireless communication device and the second wireless communication device being at least two hops away from each other in accordance with the multi-hop relay path.

Clause 28: The method of any of clauses 24-27, further including: receiving the information associated with the sequence of time slots from a controller of the multi-hop relay path.

Clause 29: The method of any of clauses 24-28, wherein the frequency channel mapping is associated with multi-primary channel operation along the multi-hop relay path.

Clause 30: The method of any of clauses 24-29, wherein the frequency channel mapping indicates different multi-primary channels for different hops of the multi-hop relay path.

Clause 31: The method of any of clauses 24-30, wherein the sequence of time slots is associated with a sequence of flow-specific back-to-back time domain multiple access slot reservations.

Clause 32: A first wireless communication device for wireless communication, including one or more memories storing processor-executable code; and one or more processors coupled with the one or more memories and individually or collectively configured to, when executing the code, cause the first wireless communication device to perform a method of any of clauses 1-12.

Clause 33: A first wireless communication device for wireless communication, including at least one means for performing a method of any of clauses 1-12.

Clause 34: A non-transitory computer-readable medium storing code for wireless communication, the code including instructions executable by one or more processors, individually or collectively, to perform a method of any of clauses 1-12.

Clause 35: A first wireless communication device for wireless communication, including one or more memories storing processor-executable code; and one or more processors coupled with the one or more memories and individually or collectively configured to, when executing the code, cause the first wireless communication device to perform a method of any of clauses 13-23.

Clause 36: A first wireless communication device for wireless communication, including at least one means for performing a method of any of clauses 13-23.

Clause 37: A non-transitory computer-readable medium storing code for wireless communication, the code including instructions executable by one or more processors, individually or collectively, to perform a method of any of clauses 13-23.

Clause 38: A first wireless communication device for wireless communication, including one or more memories storing processor-executable code; and one or more processors coupled with the one or more memories and individually or collectively configured to, when executing the code, cause the first wireless communication device to perform a method of any of clauses 24-31.

Clause 39: A first wireless communication device for wireless communication, including at least one means for performing a method of any of clauses 24-31.

Clause 40: A non-transitory computer-readable medium storing code for wireless communication, the code including instructions executable by one or more processors, individually or collectively, to perform a method of any of clauses 24-31.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless communication device, comprising:
one or more memories storing processor-executable code; and
one or more processors coupled with the one or more memories and individually or collectively configured to, when executing the code, cause the first wireless communication device to:
receive information associated with a sequence of time slots, wherein the sequence of time slots corresponds to a traffic flow associated with a multi-hop relay path;
transmit, during a transmission opportunity of the first wireless communication device, data associated with the traffic flow; and
transmit a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

2. The first wireless communication device of claim 1, wherein the one or more processors are individually or collectively configured to, when executing the code, cause the first wireless communication device to:
receive a channel access priority mapping associated with the sequence of time slots, wherein the channel access priority mapping indicates that each respective wireless communication device of the multi-hop relay path has channel access priority during a respective time slot of the sequence of time slots, and wherein the sharing of the transmission opportunity supersedes the channel access priority mapping in accordance with the frame indicating the identifier corresponding to the traffic flow.

3. The first wireless communication device of claim 2, wherein the one or more processors are individually or collectively configured to, when executing the code, cause the first wireless communication device to:
transmit the frame to the second wireless communication device in accordance with the multi-hop relay path, wherein, in accordance with the channel access priority mapping associated with the sequence of time slots, the first wireless communication device is scheduled for a first time slot of the sequence of time slots and the second wireless communication device is scheduled for a second time slot of the sequence of time slots immediately subsequent to the first time slot.

4. The first wireless communication device of claim 1, wherein the one or more processors are individually or collectively configured to, when executing the code, cause the first wireless communication device to:
transmit the frame to indicate, to the second wireless communication device, that the data associated with the traffic flow is to be relayed in accordance with the multi-hop relay path during the transmission opportunity.

5. The first wireless communication device of claim 1, wherein the one or more processors are individually or collectively configured to, when executing the code, cause the first wireless communication device to:

receive, from the second wireless communication device during the transmission opportunity, a trigger frame soliciting the data associated with the traffic flow, wherein transmitting the data is in association with receiving the trigger frame.

6. The first wireless communication device of claim 5, wherein the one or more processors are individually or collectively configured to, when executing the code, cause the first wireless communication device to:

transmit, to a third wireless communication device, a second trigger frame soliciting the data associated with the traffic flow; and receive the data associated with the traffic flow from the third wireless communication device in association with transmitting the second trigger frame, wherein transmitting the frame indicating the sharing of the transmission opportunity with the second wireless communication device is in association with receiving the data from the third wireless communication device.

7. The first wireless communication device of claim 1, wherein the one or more processors are individually or collectively configured to, when executing the code, cause the first wireless communication device to:

receive the information associated with the sequence of time slots from a controller of the multi-hop relay path.

8. The first wireless communication device of claim 1, wherein one or more channel access rules associated with the sequence of time slots are inapplicable during the transmission opportunity shared by the first wireless communication device in accordance with the frame indicating the identifier corresponding to the traffic flow and the sequence of time slots also corresponding to the traffic flow.

9. The first wireless communication device of claim 1, wherein the information associated with the sequence of time slots indicates a frequency channel mapping associated with the multi-hop relay path, the frequency channel mapping indicating that each respective wireless communication device of the multi-hop relay path uses a respective frequency channel of a plurality of frequency channels.

10. The first wireless communication device of claim 1, wherein the frame is an allocation request frame or a trigger frame.

11. The first wireless communication device of claim 1, wherein the frame indicates the identifier corresponding to the traffic flow via an information element.

12. The first wireless communication device of claim 1, wherein the sequence of time slots is associated with a sequence of flow-specific back-to-back time domain multiple access slot reservations.

13. A first wireless communication device, comprising:

one or more memories storing processor-executable code; and one or more processors coupled with the one or more memories and individually or collectively configured to, when executing the code, cause the first wireless communication device to:

receive information associated with a sequence of time slots, wherein the sequence of time slots corresponds to a traffic flow associated with a multi-hop relay path;

receive a frame indicating a sharing of a transmission opportunity with the first wireless communication device and indicating an identifier corresponding to the traffic flow; and communicate, during the transmission opportunity, data associate with the traffic flow in accordance with the frame indicating the identifier corresponding to the traffic flow.

14. The first wireless communication device of claim 13, wherein the one or more processors are individually or collectively configured to, when executing the code, cause the first wireless communication device to:

receive a channel access priority mapping associated with the sequence of time slots, wherein the channel access priority mapping indicates that each respective wireless communication device of the multi-hop relay path has channel access priority during a respective time slot of the sequence of time slots, and wherein the sharing of the transmission opportunity supersedes the channel access priority mapping in accordance with the frame indicating the identifier corresponding to the traffic flow.

15. The first wireless communication device of claim 14, wherein the one or more processors are individually or collectively configured to, when executing the code, cause the first wireless communication device to:

receive the frame from a second wireless communication device in accordance with the multi-hop relay path, wherein, in accordance with the channel access priority mapping associated with the sequence of time slots, the first wireless communication device is scheduled for a first time slot of the sequence of time slots and the second wireless communication device is scheduled for a second time slot of the sequence of time slots immediately prior to the first time slot.

16. The first wireless communication device of claim 13, wherein the one or more processors are individually or collectively configured to, when executing the code, cause the first wireless communication device to:

receive the data associated with the traffic flow from a second wireless communication device; and transmit the data during the transmission opportunity in association with a relaying of the data from the second wireless communication device to a third wireless communication device.

17. The first wireless communication device of claim 13, wherein the one or more processors are individually or collectively configured to, when executing the code, cause the first wireless communication device to:

transmit, in association with receiving the frame indicating the sharing of the transmission opportunity, a trigger frame soliciting the data associated with the traffic flow; and receive the data in association with transmitting the trigger frame.

18. The first wireless communication device of claim 13, wherein the one or more processors are individually or collectively configured to, when executing the code, cause the first wireless communication device to:

receive the information associated with the sequence of time slots from a controller of the multi-hop relay path.

19. The first wireless communication device of claim 13, wherein one or more channel access rules associated with the sequence of time slots are inapplicable during the transmission opportunity in accordance with the frame indicating the identifier corresponding to the traffic flow and the sequence of time slots also corresponding to the traffic flow.

20. The first wireless communication device of claim 13, wherein the information associated with the sequence of time slots indicates a frequency channel mapping associated with the multi-hop relay path, the frequency channel mapping indicating that each respective wireless communication device of the multi-hop relay path uses a respective frequency channel of a plurality of frequency channels.

21. A first wireless communication device, comprising:
one or more memories storing processor-executable code; and
one or more processors coupled with the one or more memories and individually or collectively configured to, when executing the code, cause the first wireless communication device to:
receive information indicating a sequence of time slots and indicating a frequency channel mapping, wherein the sequence of time slots corresponds to a traffic flow associated with a multi-hop relay path, and wherein the frequency channel mapping is associated with the multi-hop relay path and indicates that each respective wireless communication device of the multi-hop relay path uses a respective frequency channel of a plurality of frequency channels;
receive a channel access priority mapping associated with the sequence of time slots, wherein the channel access priority mapping indicates that each respective wireless communication device of the multi-hop relay path has channel access priority during a respective time slot of the sequence of time slots, and wherein the channel access priority mapping indicates a relatively highest channel access priority for the first wireless communication device for a first time slot and indicates a relatively highest channel access priority for a second wireless communication device for a second time slot of the sequence of time slots; and
transmit, via a first frequency channel during the first time slot of the sequence of time slots in accordance with the frequency channel mapping and the channel access priority mapping, data associated with the traffic flow.

22. The first wireless communication device of claim 21, wherein the frequency channel mapping indicates the first frequency channel for the first wireless communication device and a second frequency channel for the second wireless communication device.

23. The first wireless communication device of claim 21, wherein the frequency channel mapping indicates that the first wireless communication device uses the first frequency channel and the second wireless communication device uses a second frequency channel, wherein the first frequency channel and the second frequency channel are different channels in accordance with the first wireless communication device and the second wireless communication device being at least two hops away from each other in accordance with the multi-hop relay path.

24. The first wireless communication device of claim 21, wherein the one or more processors are individually or collectively configured to, when executing the code, cause the first wireless communication device to:
receive the information associated with the sequence of time slots from a controller of the multi-hop relay path.

25. The first wireless communication device of claim 21, wherein the frequency channel mapping is associated with multi-primary channel operation along the multi-hop relay path.

26. The first wireless communication device of claim 21, wherein the frequency channel mapping indicates different multi-primary channels for different hops of the multi-hop relay path.

27. A method for wireless communication by a first wireless communication device, comprising:
receiving information associated with a sequence of time slots, wherein the sequence of time slots corresponds to a traffic flow associated with a multi-hop relay path;
transmitting, during a transmission opportunity of the first wireless communication device, data associated with the traffic flow; and
transmitting a frame indicating a sharing of the transmission opportunity with a second wireless communication device of the multi-hop relay path and indicating, in accordance with the transmission opportunity at least partially overlapping with the sequence of time slots, an identifier corresponding to the traffic flow.

28. The method of claim 27, further comprising:
receiving a channel access priority mapping associated with the sequence of time slots, wherein the channel access priority mapping indicates that each respective wireless communication device of the multi-hop relay path has channel access priority during a respective time slot of the sequence of time slots, and wherein the sharing of the transmission opportunity supersedes the channel access priority mapping in accordance with the frame indicating the identifier corresponding to the traffic flow.

29. The method of claim 28, further comprising:
transmitting the frame to the second wireless communication device in accordance with the multi-hop relay path, wherein, in accordance with the channel access priority mapping associated with the sequence of time slots, the first wireless communication device is scheduled for a first time slot of the sequence of time slots and the second wireless communication device is scheduled for a second time slot of the sequence of time slots immediately subsequent to the first time slot.

* * * * *